(12) United States Patent
Suzuki

(10) Patent No.: US 8,077,482 B2
(45) Date of Patent: Dec. 13, 2011

(54) DC-DC CONVERTER

(75) Inventor: Sadanori Suzuki, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 433 days.

(21) Appl. No.: 12/302,686

(22) PCT Filed: May 30, 2007

(86) PCT No.: PCT/JP2007/060988
§ 371 (c)(1),
(2), (4) Date: Apr. 23, 2009

(87) PCT Pub. No.: WO2007/139148
PCT Pub. Date: Dec. 6, 2007

(65) Prior Publication Data
US 2009/0316440 A1    Dec. 24, 2009

(30) Foreign Application Priority Data

Jun. 1, 2006  (JP) ................................ 2006-153924
Jun. 1, 2006  (JP) ................................ 2006-153931

(51) Int. Cl.
*H02M 3/335*    (2006.01)
(52) U.S. Cl. .......................... 363/16; 363/21.18; 363/89
(58) Field of Classification Search ............. 363/15–20, 363/21.01, 21.16, 21.18, 41, 78, 80, 89, 98, 363/127; 323/250, 151, 255, 282
See application file for complete search history.

(56) References Cited

U.S. PATENT DOCUMENTS

| | | | | |
|---|---|---|---|---|
| 5,872,705 A | * | 2/1999 | Loftus et al. | 363/21.06 |
| 6,061,254 A | * | 5/2000 | Takegami | 363/21.08 |
| 6,606,257 B2 | * | 8/2003 | Bourdillon | 363/21.12 |
| 6,956,748 B2 | * | 10/2005 | Nakagawa | 363/16 |
| 6,995,987 B2 | * | 2/2006 | Song et al. | 363/17 |
| 7,532,488 B2 | * | 5/2009 | Tsuruya | 363/21.03 |

FOREIGN PATENT DOCUMENTS

| | | |
|---|---|---|
| JP | 5064448 A | 3/1993 |
| JP | 6261546 A | 9/1994 |
| JP | 8107677 A | 4/1996 |

(Continued)

*Primary Examiner* — Rajnikant Patel
(74) *Attorney, Agent, or Firm* — Woodcock Washburn LLP

(57) ABSTRACT

Provided is a DC-DC converter that can reduce losses. Ein and C1 are serially connected. Q1 and Q2 are serially connected so that antiparallel diodes thereof face the same direction. A terminal of C1 that is not connected to Ein and a terminal of Q2 that is not connected to Q1 are connected. A terminal of Ein that is not connected to C1 and a terminal of Q1 that is not connected to Q2 are connected. A coil N1 of T is connected between a connection point of Ein and C1 and a connection point of Q1 and Q2. Among a pair of terminals of a coil N2, a terminal having the same polarity as a terminal the coil N1 that is connected to Ein is connected to the connection point of C1 and Q2 through D1 and the other terminal is connected to the connection point of Ein and C1. A coil N3 is connected to a smoothing circuit through a rectification circuit. The direction of D1 is set in such a manner that energy can be transferred to C1 from the coil N2 when Q1 is in a conduction state. The rectification circuit applies a voltage of the same polarity to the smoothing circuit in both case where S1 is in a conduction state and Q2 is in a conduction state.

8 Claims, 33 Drawing Sheets

FOREIGN PATENT DOCUMENTS

| | | |
|---|---|---|
| JP | 9312973 | 12/1997 |
| JP | 11146648 A | 5/1999 |
| JP | 112254473 A | 8/1999 |
| JP | 11356045 A | 12/1999 |
| JP | 2000102252 A | 4/2000 |
| JP | 2000262055 A | 9/2000 |
| JP | 2004056840 A | 2/2004 |
| JP | 2005269792 A | 9/2005 |

\* cited by examiner

DC-DC CONVERTER

TECHNICAL FIELD

The present invention relates to a DC-DC converter. In particular, the present invention relates to a DC-DC converter that can reduce losses.

BACKGROUND

As shown in FIG. 31, a DC-DC converter 100 of a flyback type disclosed in Patent Document 1 stores the power stored in a leakage inductance it in a condenser C101 through a parasitic diode of a transistor Q102 and a transformer coil N103 when a transistor Q101 is turned OFF. The energy stored in the condenser C101 is output to a secondary side through a transformer T by turning ON the transistor Q102.

As shown in FIG. 32, a DC-DC converter 201 of a flyback type disclosed in Patent Document 2 has a converter circuit 203 that converts a direct-current input to alternate current so as to transmit to a primary coil of a transformer 202 arranged at the post-stage, and a rectification circuit 204 arranged at the post-stage of the transformer 202, the rectification circuit rectifying the alternate current obtained from the secondary coil of the transformer 202. In the converter circuit 203, MOSFET 209 and 210 are connected in a bridge configuration to constitute a half bridge and condensers 211 and 212 connected in series are connected in parallel to MOSFET 9 and 10. Further, the positive terminal of the primary coil of the transformer 202 is connected between the MOSFET 209 and the MOSFET 210 and the negative terminal of the primary coil of the transformer 202 is connected between the condenser 211 and the condenser 212.

When the MOSFET 210 conducts, an electric current path at the primary side passes from the condenser 212 through the transformer 202 and the MOSFET 210 to go back to the condenser 212. Also, when the MOSFET 209 conducts, the electric current path at the primary side passes from the condenser 211 through the MOSFET 209 and the transformer 202 to go back to the condenser 211.

A DC-DC converter 300 disclosed in Patent Document 3 is shown in FIG. 33. Energy stored in a transformer is stored in snubber condensers 108A and 107 when a semiconductor switch element 105A is turned OFF. The energy stored in the snubber condenser 107 is regenerated to a power supply 101 and the energy that stored in the snubber condenser 108A also refreshes to the power supply 101, by turning ON a semiconductor switch element 106B immediately before the semiconductor switch element 105A is turned ON.

In addition, there are DC-DC converters disclosed in Patent Documents 4 to 9, as other related technologies.

Patent Document 1: Japanese Unexamined Patent Publication No. 2000-262055

Patent Document 2: Japanese Unexamined Patent Publication No. 2005-269792

Patent Document 3: Japanese Unexamined Patent Publication No. 11 (1999)-146648

Patent Document 4: Japanese Unexamined Patent Publication No. 6 (1994)-261546

Patent Document 5: Japanese Unexamined Patent Publication No. 9 (1997)-312973

Patent Document 6: Japanese Unexamined Patent Publication No. 11 (1999)-225473

Patent Document 7: Japanese Unexamined Patent Publication No. 11 (1999)-356045

Patent Document 8: Japanese Unexamined Patent Publication No. 5 (1993)-64448

Patent Document 9: Japanese Unexamined Patent Publication No. 8 (1996)-107677

SUMMARY

Problems which the Invention is to Solve

When the configuration of the DC-DC converter 100 of the flyback type disclosed in the above-mentioned Patent Document 1 is applied to a DC-DC converter of a forward type, it is necessary to reverse a polarity of a transformer coil N102 of the secondary side. However, when the polarity of the transformer coil N102 is reversed, since the direction of an exciting current at the turn-off of the transistor Q101 reverses by the transformer 25 coil N101 and N103, a significantly high surge voltage might be generated. Therefore, it is a problem since the configuration of the DC-DC converter 100 cannot be applied to the DC-DC converter of the forward type.

Also, since the DC-DC converter 201 of above-described Patent Document 2 is a half bridge converter, only half the voltage of a power supply voltage can be applied to the primary coil of the transformer. Therefore, when converting the same energy, an electric current flowing to the primary coil of the transformer becomes large, so that losses are increased in the switching element.

In the DC-DC converter 300 of Patent Document 3, switching losses are reduced by including the snubber condenser 108A about the semiconductor switch element 105A. However, any means to reduce the switching losses of the semiconductor switch element 106B are not disclosed. Then, it is the problem since the switching losses of the semiconductor switch element of the DC-DC converter 300 cannot be reduced enough.

Moreover, since the DC-DC converter 300 is a forward type single-transistor DC-DC converter, reset of the transformer is needed. It is a problem that the switching losses are large since this DC-DC converter 300 adjusts an operating duty only to about 50%.

The present invention is performed to solve the problems of above-mentioned conventional technologies and an object thereof is to provide a DC-DC converter of a forward type consisting of a new circuit that can reduce losses.

Means for Solving the Problems

In order to achieve the object above, according to claim 1, there is provided a DC-DC converter of a forward type comprising: a direct-current power supply; a first condenser; a first semiconductor switch element provided with an antiparallel diode; a second semiconductor switch element provided with an antiparallel diode; a first diode; a transformer provided with a first coil, a second coil and a third coil; a rectification circuit; and a smoothing circuit, wherein the direct-current power supply and the first condenser are connected in series, wherein the first semiconductor switch element and the second semiconductor switch element are connected in such a manner that the antiparallel diode of the first semiconductor switch element and the antiparallel diode of the second semiconductor switch element face a same direction, wherein a terminal of the first condenser that is not connected to the direct-current power supply and a terminal of the second semiconductor switch element that is not connected to the first semiconductor switch element are connected with each other, wherein a terminal of the direct-current power supply that is not connected to the first condenser and a terminal of the first semiconductor switch element that is not connected to the second semiconductor switch element are connected with each other, wherein the first coil of the transformer is connected between a connection point of the direct-current power supply and the first condenser and a connection point of the first semiconductor switch element and the second semiconductor switch element, wherein among a pair of terminals of the second coil of the transformer, one terminal of a same polarity as a terminal of the first coil that is connected to the direct-current power supply is connected to a connection point of the first condenser and the second semiconductor switch element through the first diode, and other terminal is connected to the connection point of the direct-power supply and the first condenser, wherein the third coil of the transformer is connected to the smoothing circuit through the rectification circuit, wherein a direction of the first diode is set in such a manner that energy can be transferred to the first condenser from the second coil of the transformer when the first semiconductor switch element is in a conduction state, and wherein the rectification circuit applies a voltage of same polarity to the smoothing circuit in both case where the first semiconductor switch element is in a conduction state and the second semiconductor switch element is in a conduction state.

It is to be noted that the polarity of the terminal of the coil represents a relative relationship between the direction of a voltage applied to a coil to be excited and the direction of a voltage generated in other coil. The terms "the polarity of a terminal of one coil is the same as the polarity of a terminal of the other coil" means that the direction of the voltage (high/low of the voltage) of the terminal of the other terminal with reference to said terminal of one coil is the same as the direction of the voltage of the terminal of the other coil with reference to said terminal of the other coil.

When the first semiconductor switch comes into a conduction state, an electric current flows from the direct-current power supply to the first coil of the transformer and thereby the transformer is excited. Then, voltages are generated in the second coil and the third coil. The first diode is brought into a conduction state due to the voltage generated in the second coil and an electric current flows from the second coil to the first condenser, so that the first condenser is charged. In other words, energy is transferred from the second coil to the first condenser. In addition, since a voltage is generated in the third coil, energy is supplied from the third coil to the smoothing circuit through the rectification circuit. In this time, energy is stored in the first coil through the electric current flowing thereto.

When the first semiconductor switch element changes into non-conduction state, the voltage applied to the first semiconductor switch element rises rapidly because of the energy stored in the first coil. At this time, turn-off power losses are occurred in the first semiconductor switch element. However, in the DC-DC converter according to the present invention, when the voltage applied to the first semiconductor switch element rises, the antiparallel diode of the second semiconductor switch element is brought into conduction state, and then the electric current from the first coil flows into the first condenser. That is, the voltage applied to the first semiconductor switch element is clamped by the voltage of the sum with the voltage of the direct-current power supply and the voltage of the condenser. As a result, the turn-off power losses of the first semiconductor switch element are reduced. Moreover, a part of the energy stored in the first coil during the period when the first semiconductor switch element is in the conduction state is charged to the first condenser. As a result, losses in the DC-DC converter can be reduced.

When the second semiconductor switch element comes into the conduction state, an electric current is passed from the condenser through the first coil of the transformer to excite the transformer and thereby voltages are generated in the second coil and the third coil. In this time, the direction of the voltage generated in the second coil is the reverse of the direction generated during the first semiconductor switch element is in the conduction state. As a result, the first diode becomes a cut-off status. The voltage generated in the third coil also reverses the voltage generated during the first semiconductor switch element is in the conduction state. However, energy is supplied to the smoothing circuit through the rectification circuit similar to the case where the first semiconductor switch element comes into the conduction state.

When the second semiconductor switch element changes into the non-conduction state, the voltage applied to the second semiconductor switch element rises rapidly because of the energy stored in the first coil. When the voltage applied to the second semiconductor switch element rises, the antiparallel diode of the first semiconductor switch element is turned ON, and then the electric current flows from the first coil to the direct-current power supply. As a result, since the voltage applied to the second semiconductor switch element is clamped by the voltage of the sum of the voltage of the direct-current power supply and the voltage of the condenser, the turn-off power losses are reduced. Moreover, a part of the energy stored in the first coil during the period when the first semiconductor switch element is in the conduction state is regenerated to the direct-current power supply. As a result, the losses in the DC-DC converter can be reduced.

The new circuit of the DC-DC converter of the forward type is configured as explained above.

There is provided a DC-DC converter wherein the smoothing circuit is comprised of a smoothing coil, a smoothing condenser and a commutation diode.

This construction makes it possible to control an output voltage by adjusting the ratio of conduction period (ON period) to non-conduction period (OFF period) of the first semiconductor switch element and the second semiconductor switch element, while retaining the advantageous effect of the invention according to claim 1.

There is provided a DC-DC converter wherein the rectification circuit is comprised of a second diode and a third diode, wherein the third coil of the transformer is provided with a middle terminal, wherein a first polarity terminal of the second diode is connected to one end of the third coil, wherein a first polarity terminal of the third diode is connected to other end of the third coil, wherein respective second polarity terminals of the second diode and the third diode are both connected to one end of a pair of input terminals of the smoothing circuit, and wherein the middle terminal is connected to other end of the pair of input terminals of the smoothing circuit.

In this invention, the advantageous effect can be also obtained similarly to the invention of claim 1.

There is provided a DC-DC converter wherein the rectification circuit is a diode bridge comprised of four diodes.

There is provided a DC-DC converter wherein the first semiconductor switch element is turned on during a period when the antiparallel diode of the first semiconductor switch element is in a conduction state, and wherein the second semiconductor switch element is turned on during a period when the antiparallel diode of the second semiconductor switch element is in a conduction state.

In this invention, the first semiconductor switch is turned on during the period when the antiparallel diode of the first semiconductor switch is in a conduction state. Since the inter terminal voltage of the first semiconductor switch element is 0(V), Zero Volt Switching (ZVS) is performed to thereby reduce the switching losses. Similarly, since the second semiconductor switching element is turned ON during the period when the antiparallel diode of the second semiconductor switch element is in a conduction state, Zero Volt Switching (ZVS) is performed to thereby reduce the switching losses.

There is provided a DC-DC converter comprising: a second condenser that is connected to the first semiconductor switch element in parallel; and a third condenser that is connected to the second semiconductor switch element in parallel.

In the present invention, while the first semiconductor switch element is in a conduction state, the third condenser is charged up to the total voltage with the voltage of the direct-current power supply and the first condenser, and then the second condenser comes into a state of non-charge.

When the first semiconductor switch element changes into non-conduction state, the second condenser is charged by the consecutiveness of the electric current that flows to the first coil. At the same time, the energy stored in the third condenser is transported to the first condenser by the path that passes the first condenser and the first coil. When the voltage of the second condenser is charged up to the total voltage with the voltage of the direct-current power supply and the first condenser, the third condenser comes into a state of non-charge, and then the antiparallel diode of the second semiconductor switch element is brought into the conduction state. The electric current of the first coil passes through the antiparallel diode of the second semiconductor switch element and the first condenser, so that the energy stored in the first coil is transported to the first condenser.

Here, if there is not provided the second condenser, when the first semiconductor switch element is changed from conduction state to non-conduction state, the electric current keeps flowing to the first semiconductor switch element because of the energy stored in the first coil of the transformer, and thereby the turn-off power losses occurs. However, in the DC-DC converter according to the present invention, the electric current that flows to the first semiconductor switch element decreases since a part of the electric current that flows to the first semiconductor switch element shunts to the second condenser by including the second condenser. As a result, the turn-off power losses of the first semiconductor switch element are reduced.

When the second semiconductor switch element changes from conduction state to non-conduction state, the third condenser is charged by the consecutiveness of the electric current that flows to the first coil. At the same time, the energy stored in the second condenser is regenerated to the direct-current power supply by the path that passes the first condenser and the first coil. When the voltage of the third condenser is charged up to the total voltage with the voltage of the direct-current power supply and the first condenser, the second condenser comes into a state of non-charge, and then the antiparallel diode of the first semiconductor switch element is brought into the conduction state. The electric current of the first coil passes through the antiparallel diode of the first semiconductor switch element and the direct-current power supply, so that the energy stored in the first coil is regenerated to the direct-current power supply.

Here, if there is not provided the third condenser, when the second semiconductor switch element changes from conduction state to non-conduction state, the electric current keeps flowing to the second semiconductor switch element because of the energy stored in the first coil of the transformer, so that the turn-off power losses occurs. However, in the DC-DC converter according to the present invention, the electric current that flows to the second semiconductor switch element decreases since a part of the electric current that flows to the second semiconductor switch element shunts to the third condenser by including the third condenser. Moreover, losses will be prevented since the energy stored in the second condenser is regenerated to the direct-current power supply and the energy stored in the third condenser is transported to the first condenser.

There is provided a DC-DC converter wherein a capacity of the first condenser is increased in proportion to a capacity of the third condenser.

Since the capacity of the first condenser is increased in proportion to the capacity of the third condenser, it is possible to reduce variation of the voltage of the first condenser when the electric charge stored in the third condenser is transported to the first condenser.

There is provided a DC-DC converter according to claim 6, wherein the first semiconductor switch element is turned on during a period when the second condenser is in a non-charge state, and wherein the second semiconductor switch element is turned on during a period when the third condenser is in a non-charge state.

The electric charge of the second condenser is refreshed to the direct-current power supply via the first coil. And then, transistor $1 is turned ON for the period when the second condenser is in a non-charge state after the refresh ends. Under such a condition, since the inter terminal voltage of the first semiconductor switch element is 0(V), Zero Volt Switching (ZVS) is performed, and it is possible to reduce the switching losses. Similarly, since the transistor Q2 is turned ON when the third condenser is in a non-charge state, Zero Volt Switching (ZVS) is performed, and it is possible to reduce the switching losses.

Effect of the Invention

According to the present invention, it is possible to provide the DC-DC converter that can reduce the losses.

BRIEF DESCRIPTION OF THE DRAWINGS

FIG. 30 is a circuit diagram showing a DC-DC converter 1a.

DETAILED DESCRIPTION OF ILLUSTRATIVE EMBODIMENTS

Explanation of References

Ein direct-current power supply
C1 condenser as a first condenser
C2 condenser as a smoothing condenser
C3 condenser as a second condenser
C4 condenser as a third condenser
Q1 transistor as a first semiconductor switch element
Q2 transistor as a second semiconductor switch element
D1 diode as a first diode
D2 diode as a second diode
D3 diode as a third diode
D4 commutation diode
N1 coil as a first coil
N2 coil as a second coil
N3-N5 coils as third coils
T transformer
L4 smoothing coil

BEST MODE FOR CARRYING OUT THE INVENTION

Figure 1:
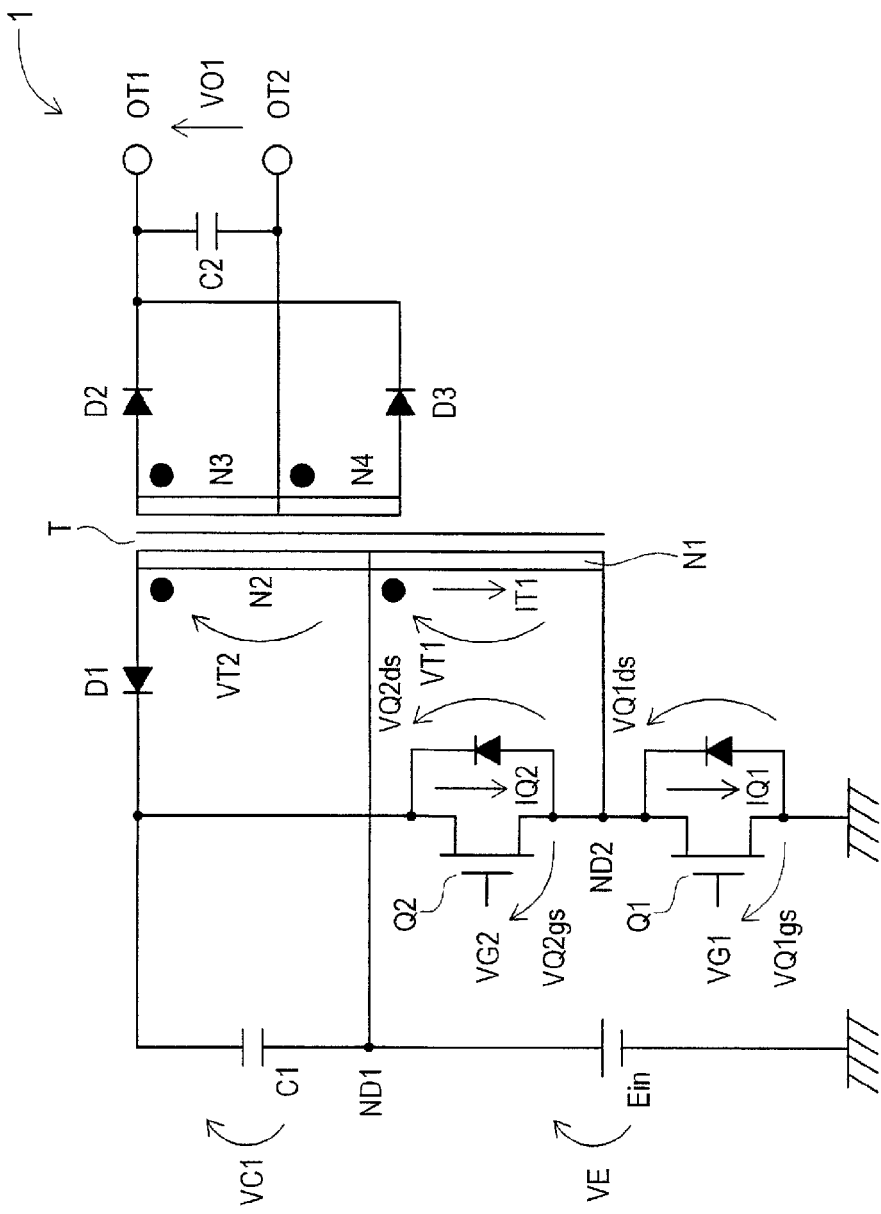
FIG. 1 is a circuit diagram showing a DC-DC converter 1.
Figure 2:
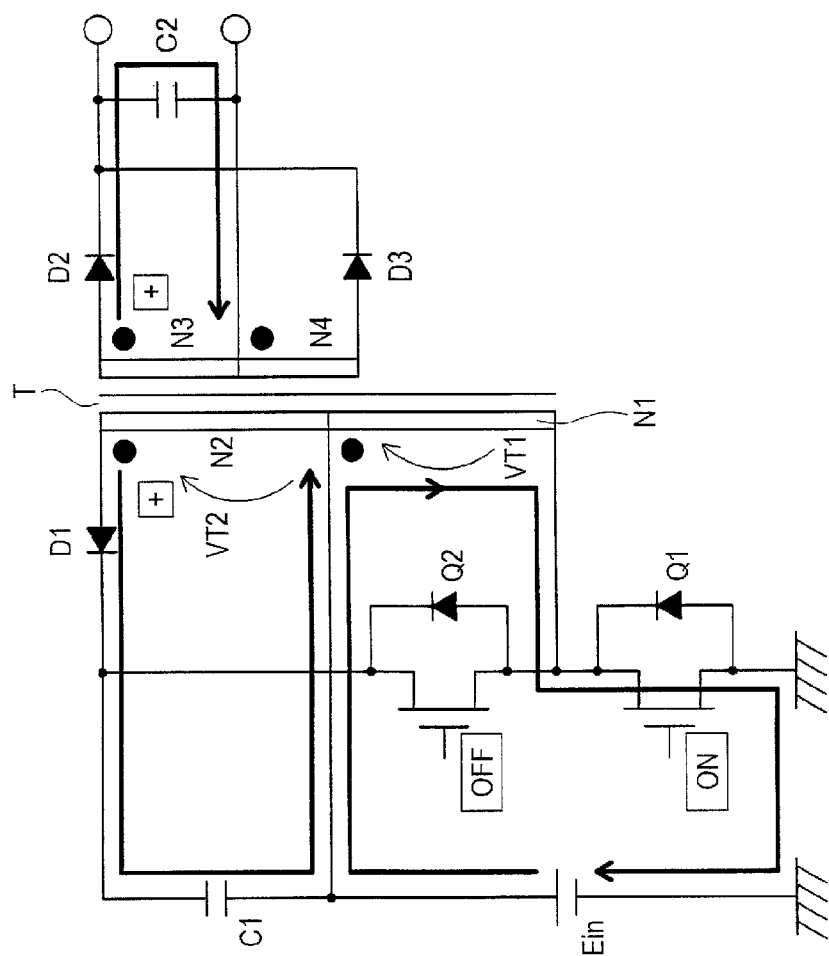
FIG. 2 is a figure showing an operating state of the DC-DC converter 1 (No. 1).

Hereafter, the first embodiment embodied about a DC-DC converter of the present invention will be explained in detail referring to the drawing on the basis of FIG. 1 to FIG. 7. FIG. 1 is a circuit diagram showing a DC-DC converter 1 according to this embodiment. A positive terminal of a direct-current power supply Ein is connected with a part of a condenser C1 that is a first condenser by the series on a node ND1 that is a connection point. A drain terminal of an NMOS type transistor Q1 that is a first semiconductor switch element is connected with a source terminal of an NMOS type transistor Q2 that is a second semiconductor switch element by the series on a node ND2 that is a connection point. Both a negative pole of the direct-current power supply Ein and a source terminal of the transistor Q1 are connected with the ground. Moreover, the other end of the condenser C1 is connected with a drain terminal of the transistor Q2. Control signals VG1 and VG2 from a controller (not shown in the figure) are input to gate terminals of the transistors $1 and Q2. Here, the capacity of condenser C1 is adjusted to a large value of extent for which a power equal with a power supplied from the direct-current power supply Ein when the transistor Q1 is in the conduction state can be supplied when the transistor Q2 is in the conduction state. Moreover, the voltages between the source and the gate of the transistors Q1 and Q2 are assumed to be VQ1$gs$ and VQ2$gs$ respectively. Moreover, the voltages between the drain and the source of the transistors Q1 and Q2 are assumed to be VQ1$ds$ and VQ2$ds$ respectively. Furthermore, the voltage of the direct-current power supply Ein is assumed to be VE, and the both ends voltage of the condenser C1 is assumed to be VC1. A relation that the sum of the VQ1$ds$ and VQ2$ds$ and the sum of the voltage (VE) of the direct-current power supply Ein and the voltage (VC1) of the condenser C1 become equal is approved.

The DC-DC converter 1 includes a transformer T. The transformer T includes a first coil N1 (number of turns is n1), a second coil N2 (number of turns is n2), and a third coils N3 and N4 (numbers of turns are n3 and n4).

In this embodiment, a turn ratio n1:n2 of the coil N1 and the coil N2 is 1:1. One end of the coil N2 is connected with an anode terminal of a diode D1, and a cathode terminal of the diode D1 is connected with the condenser C1 and the transistor Q2. Moreover, one end of the coil N1 is connected with the node ND2. Moreover, the other end of the coil N1 and the other end of the coil N2 are both connected with node ND1. Here, an electric current that flows to the coil N1 is referred to as IT1. Moreover, voltages of the coils N1 and N2 are referred to as VT1 and VT2 respectively. Moreover, electric currents that flow to the transistors Q1 and Q2 are referred to as IQ1 and IQ2 respectively.

Diodes D2 and D3, a condenser C2 constituting a smoothing circuit, and output terminals OT1 and OT2 that configure a rectification smoothing circuit are connected with the third coils N3 and N4 of the transformer T. As for the coils N3 and N4, one end of the coil N3 and one end of the coil N4 are connected in a common terminal, which is connected with the output terminal OT2. The other end of the coil N3 is connected with an anode of the diode D2, and the other end of the coil N4 is connected with an anode of the diode D3. Cathodes of the diodes D2 and D3 are both connected with the output terminal OT1. Moreover, the condenser C2 for smoothness is connected between the output terminals OT1 and OT2.

Next, an operation of the DC-DC converter 1 according to this embodiment will be explained. First of all, an operation at the start-up will be explained. Firstly, a charge to the condenser C1 is performed by the coil N2 and the diode D1 along with the start-up of the DC-DC converter 1. Here, as for the charge of the condenser C1 at the start-up of the DC-DC converter 1, a soft-start control is performed to prevent a rush current being generated in the condenser C1. The soft-start control is performed by gradually enlarging on a duty of the transistors $1 and Q2 with a controlling circuit as not shown in the figure.

The charge to the condenser C1 is performed by the coil N2. Here, the value of the VC1 is decided by the turn ratio with the number of turns n1 of the coil N1 and the number of turns n2 of the coil N2. In this embodiment, the ratio of the number of turns is n1:n2=1:1. Therefore, the value of the voltage VC1 rises to a value equal to the voltage (VE) of the direct-current power supply Ein.

Next, an operation at the stationary state of the DC-DC converter 1 will be explained by using FIG. 2 to FIG. 7. The operating state of the circuit in each operation is shown in FIG. 2 to FIG. 6. FIG. 7 is an operation waveform diagram. At time t1, the VQ1gs is a high level and the transistor Q1 conducts, and then it moves for a period (1).

At the period (1) (FIG. 2), when the transistor Q1 comes into the conduction state (turn-on), an exciting current flows from the direct-current power supply Ein to the coil N1 of the transformer T, and as a result the voltage is generated in the coils N2, N3, and N4.

The value of the VT2 is a value decided in the ratio of the number of turns for the coils N1 and N2. Since the turn ratio is 1:1 in this embodiment, the value of the VT2 reaches a value (VE) equal to the VT1. And then, a current path that passes the condenser C1 is established from the coil N2 through the diode D1, and the condenser C1 is charged.

Moreover, the voltage generated in the coils N3 and N4 of the transformer T is decided by the turn ratio with the coil N1. The voltage of ((n3In1)×VE) is generated in the coils N3 and N4 since it is equally set up the number of turns n3 and n4 in this embodiment. And then, the diode D2 comes into a conduction state as well as the diode D3 becomes a cut-off state, and a voltage is applied from the coil N3 to a load (as not shown in the 5 figure) through the rectification circuit and the smoothing circuit.

Figure 3:
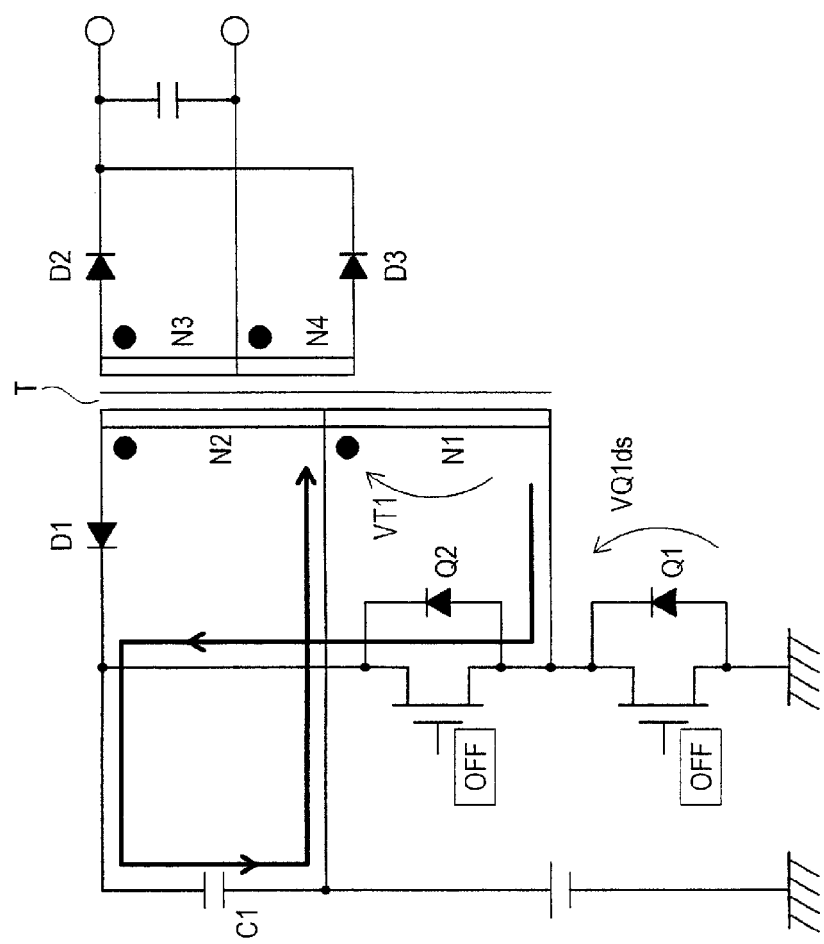
FIG. 3 is a figure showing an operating state of the DC-DC converter 1 (No. 2).

When the period when the transistor Q1 is turned ON elapses, the transistor Q1 comes into non-conduction state at time t2 since the VQ1gs changes to the low level, and then it moves for a period (2) (FIG. 3). In the period (2), VT1 of the coil N1 becomes –VE. At this time, the VQ1ds rises by the energy stored in the coil N1 of the transformer T. When the VQ1ds rises to sum (2×VE) with the voltage (VE) of the direct-current power supply Ein and the voltage (VE) of the condenser C1, the antiparallel diode of the transistor $2 conducts, and the electric current that flows to the coil N1 flows in the condenser C1, and charges with the condenser C1. Therefore, since the VQ1ds is fixed to (2×VE), the turn-off power losses of the transistor Q1 can be reduced compared with the case where the countermeasure to rising of the voltage between the drain and the source by the electric current that flows to the coil N1 is not applied. Moreover, since the condenser C1 is charged by part of the electric current that flows to the coil N1, and the energy is supplied from the condenser C1 to the load through the transformer T at a period (3) that will explain next, the conversion efficiency of the DC-DC converter improves.

Figure 4:
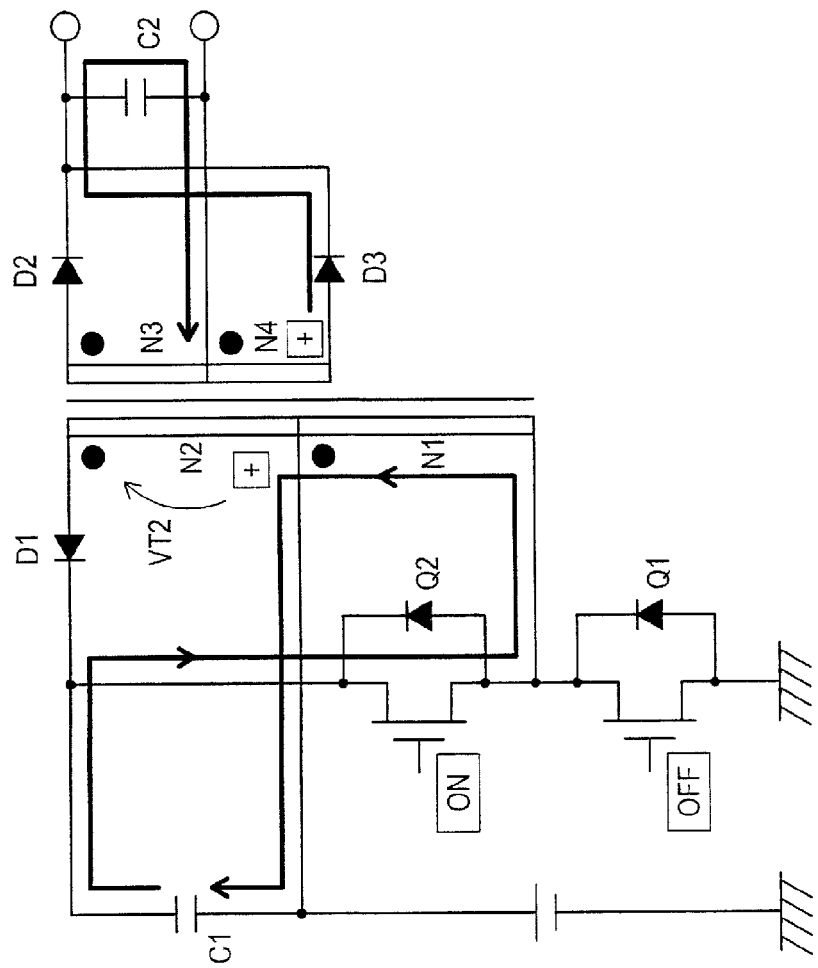
FIG. 4 is a figure showing an operating state of the DC-DC converter 1 (No. 3).

The transistor Q2 comes into a conduction state (turn-on) by changing the VQ2gs to the high level at time t3, and then it moves for a period (3) (FIG. 4). If the electric current keeps flowing to the coil N1, the antiparallel diode of the transistor Q2 and the condenser C1 at time t3, Zero Volt Switching (ZVS) is performed and thereby the switching losses can be reduced since the voltage VQ2ds is 0(V).

Under such a condition, a current path that passes the transistor Q2 5 and the coil N1 of the transformer T from the condenser C1 is established, the exciting current flows from the condenser C1 to the coil N1 of the transformer T, and a voltage is generated in the coils N2, N3, and N4. At this time, the direction where the coil N1 is excited reverses compared with the case where the transistor Q1 comes into the conduction state. Therefore, since the polarity of the VT2 reverses, the diode D1 becomes a cut-off status, and the charge path from the coil N2 to the condenser C1 is intercepted. Moreover, the diode D2 also becomes the cut-off status, and the diode D3 comes into the conduction state. Therefore, a voltage is applied from the coil N4 to the load (as not shown in the figure) through the rectification circuit and the smoothing circuit. At this time, the electric current that flows to the transistor Q2 and the coil N1 of the transformer T becomes a sum with the exciting current and (n41n1) times the electric current that flows to the coil N4.

Here, since condenser C1 is charged by also the coil N2 and the diode D1 during "ON period of the transistor Q1, the energy that can supply energy equal to the direct-current power supply Ein in the "ON period of the transistor Q2 is stored in the condenser C1. As a result, since the difference of the voltage applied to the condenser C2 of the smoothing circuit can be reduced between the "ON period (1) when the transistor Q1 conducts and the "ON" period (3) when the transistor Q2 conducts, reducing the ripple of the output voltage V01 between the output terminals OT1 and OT2 becomes possible. Moreover, since the difference of the voltage applied to the condenser C2 at the period (1) and the period (3) can be reduced, the electric current that flows to the condenser C2 can be reduced, and it is possible to prevent the lifetime of the condenser C2 from shortening.

Figure 5:
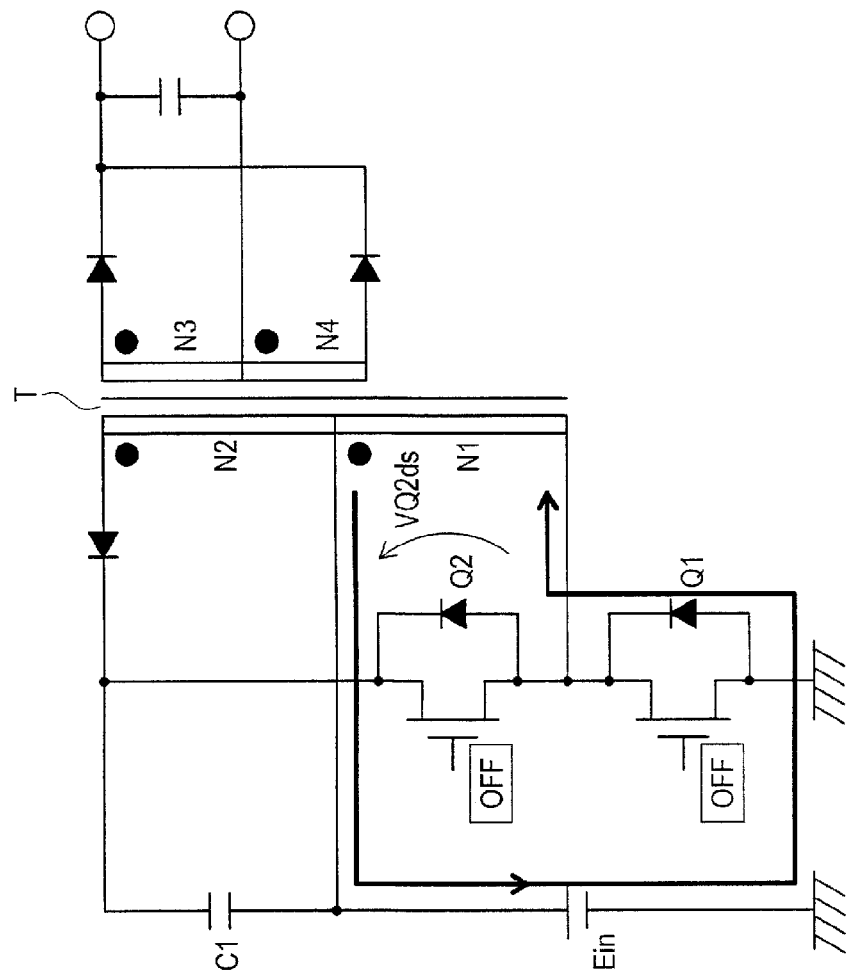
FIG. 5 is a figure showing an operating state of the DC-DC converter 1 (No. 4).

When the period when the transistor Q2 is turned ON elapses, the transistor Q2 comes into non-conduction state at time t4 since the VQ2gs changes to the low level, and then it moves for a period (4) (FIG. 5). When the transistor Q2 comes into the non-conduction state, the VQ2ds rises by the energy stored in the coil N1 of the transformer T. When the VQ2ds rises to a sum (2×VE) with the voltage (VE) of the direct-current power supply Ein and the voltage (VE) of the condenser C1, the antiparallel diode of the transistor Q1 conducts, and the electric current that flows to the coil N1 regenerates to the direct-current power supply Ein. Therefore, since the VQ2ds is fixed to (~×VE)t,h e turn-off power losses of the transistor Q2 can be reduced compared with the case where the countermeasure to rising of the voltage between the drain and the source by the electric current that flows to the coil N1 is not applied. Moreover, since a part of the electric current that flows to the coil N1 is regenerated to the direct-current power supply Ein, the conversion efficiency of the DC-DC converter improves.

Figure 6:
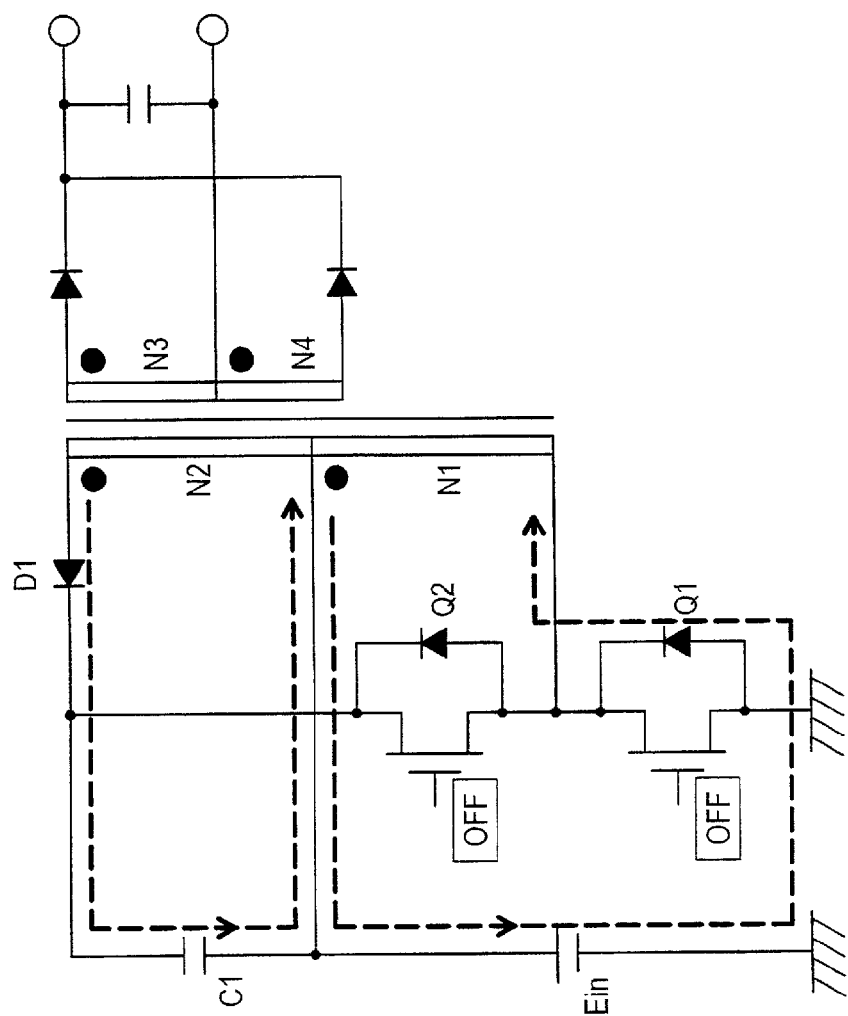
FIG. 6 is a figure showing an operating state of the DC-DC converter 1 (No. 5).
Figure 7:
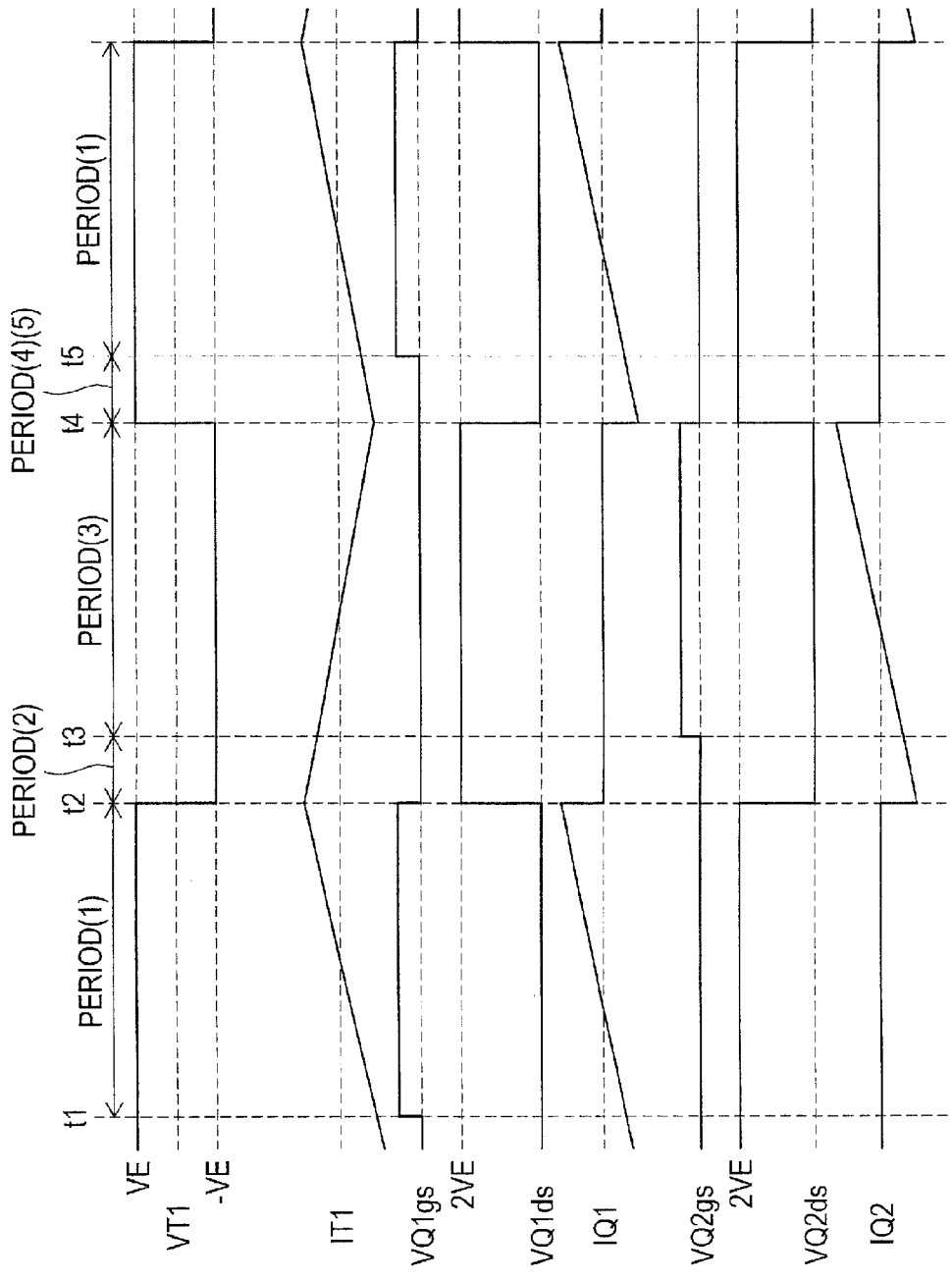
FIG. 7 is a waveform diagram of an operation of the DC-DC converter 1.

For a period (5) after the voltage of the VQ2ds rises to sum (2×VE) of the voltage (VE) of the direct-current power supply Ein and the voltage (VE) of the condenser C1, the electric current that flows to the coil N1 flows by a path of either of a path that regenerates from the coil N1 to the direct-current power supply Ein through the transistor Q1 or a path that charges with the condenser C1 from the coil N2 through the diode D1 (FIG. 6). Incidentally, according to circuit composition etc., it is decided whether the exciting current will flow through which path.

By the VQ1gs's transition to the high level at time t5, the transistor Q1 comes into a conduction state (turn-on) and it moves to the period (1). Thereafter, the periods (1) through (5) are repeated.

As explained to the detail above, a DC-DC converter of the forward type of the new circuit is configured by the DC-DC converter 1 according to this embodiment. And then, since the VQ1ds and VQ2ds are fixed to a constant voltage (2×VE) when the transistors Q1 and Q2 comes into the non-conduction states, the turn-off power losses of the transistors Q1 and Q2 can be reduced. Moreover, the energy stored in the coil N1 is transported to the condenser C1 when the transistor Q1 is turned OFF, and the power stored in the leakage inductance regenerates to the direct-current power supply Ein when the transistor Q2 is turned OFF. As a result, the conversion efficiency of the DC-DC converter can be improved.

Moreover, the condenser C1 is charged by not only the energy stored in the coil N1 but also the coil N2 and the diode D1. Therefore, the energy that can supply energy equal to the direct-current power supply Ein in the "ON period of the transistor Q2 can be stored in the condenser C1. As a result, since the difference of the voltage applied to the condenser C2 of the smoothing circuit can be reduced between the "ON period (1) when the transistor $1 conducts and the "ON period (3) when the transistor $2 conducts, reducing the ripple of the output voltage V01 between the output terminals OT1 and OT2 becomes possible. Moreover, since the electric current that flows to the condenser C2 can be reduced, and it is possible to prevent the lifetime of the condenser C2 from shortening.

Moreover, the VT2 becomes equal to the VT1 by assuming the turn ratio of the coils N1 and N2 to be n1:n2=1:1. Then, the voltage of the direct-current power supply Ein becomes equal to the voltage of the condenser C1. As a result, the maximum value of the voltage generated in the coils N3 and N4 of the transformer T becomes equal between the period (1) and the period (3). As a result, the ripple of the output voltage V01 can be further reduced.

Moreover, since the DC-DC converter 1 of the forward type can be configured, the core of transformer T can be reduced compared with a flyback type DC-DC converter of the same output voltage, and it is possible to attempt the miniaturization of the DC-DC converter 1. Moreover, since it is the converter of the forward type, it is possible to improve the controllability more and to supply the high-power more, compared with the converter of the flyback type.

Figure 32:
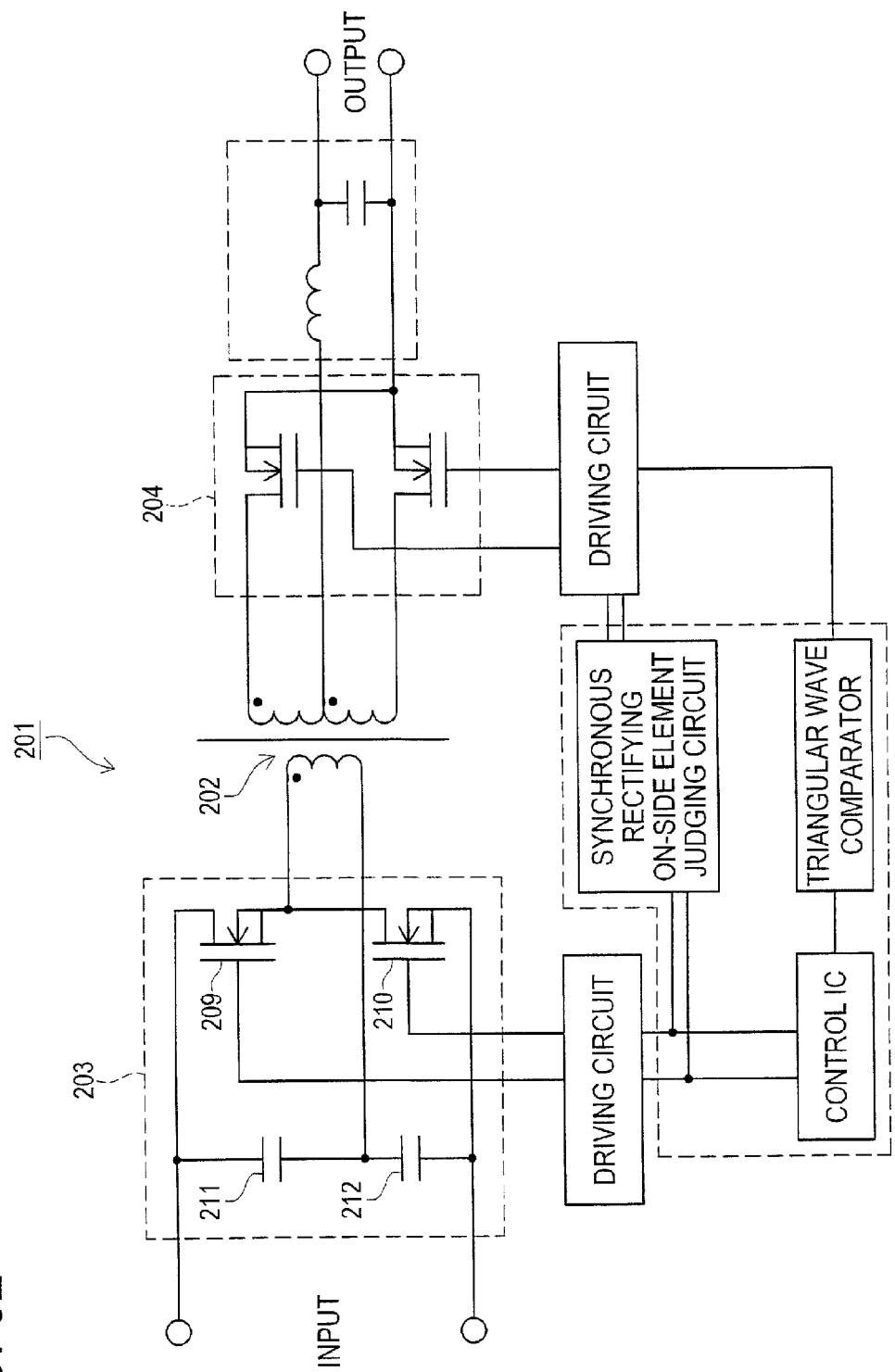
FIG. 32 is a circuit diagram showing a DC-DC converter 201 of a flyback type disclosed in Patent Document 2.
Figure 33:
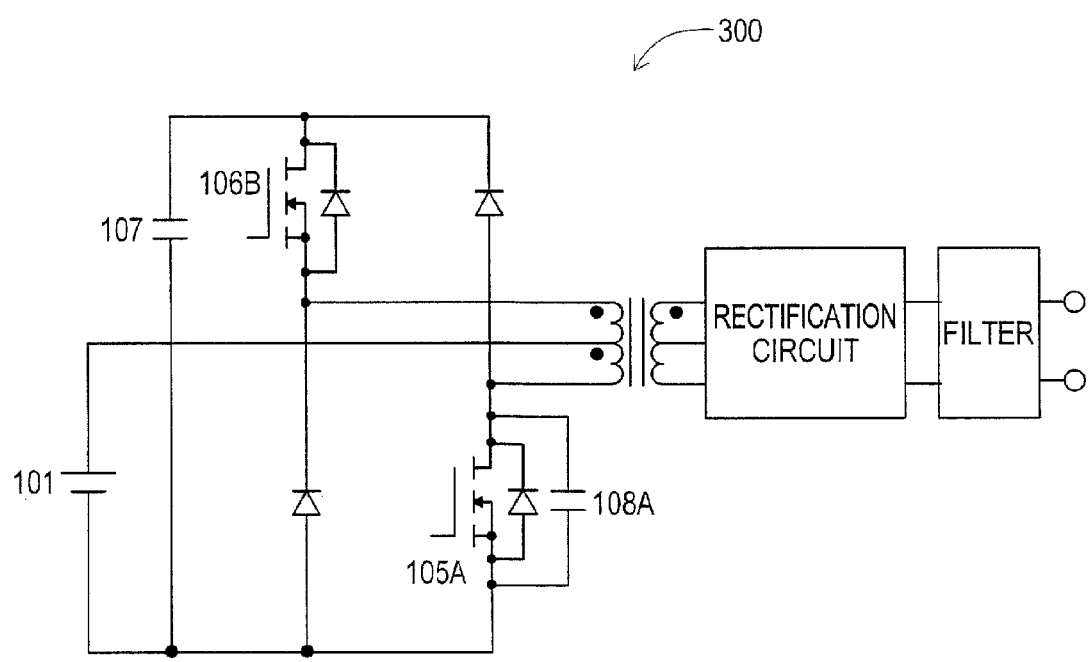
FIG. 33 is a circuit diagram showing a DC-DC converter 300 disclosed in Patent Document 3.

The DC-DC converter of the present invention shown in FIG. 1 has the direct-current power supply Ein in place of the condenser 212 at the lower side of a half bridge circuit of the conventional DC-DC converter 201 shown in FIG. 32. Additionally, the DC-DC converter of the present invention has the coil N2 and the diode D1. Accordingly, it is possible to charge the condenser C1 corresponding to the upper condenser to the voltage VE from the coil N2 in the period (1) and to discharge from the condenser C1 to the coil N1 in the period (3). Therefore, the condenser C1 can be used as a direct-current power supply of the voltage VE. In comparison to the conventional DC-DC converter 201 which can apply only half of the input direct-current power supply to the primary side of the transformer, the DC-DC converter 1 of the present invention can apply the voltage VE as the full voltage of the direct-current power supply Ein to the coil N1. In other words, since a voltage to be applied to the coil N1 can be increased in conversion of power, an electric current flowing to the coil N1, the transistors Q1 and Q2 can be reduced to thereby reduce losses. Additionally, the number of turns of coils N3 and N4 to the coil N1 of the transformer T can be reduced.

Figure 8:
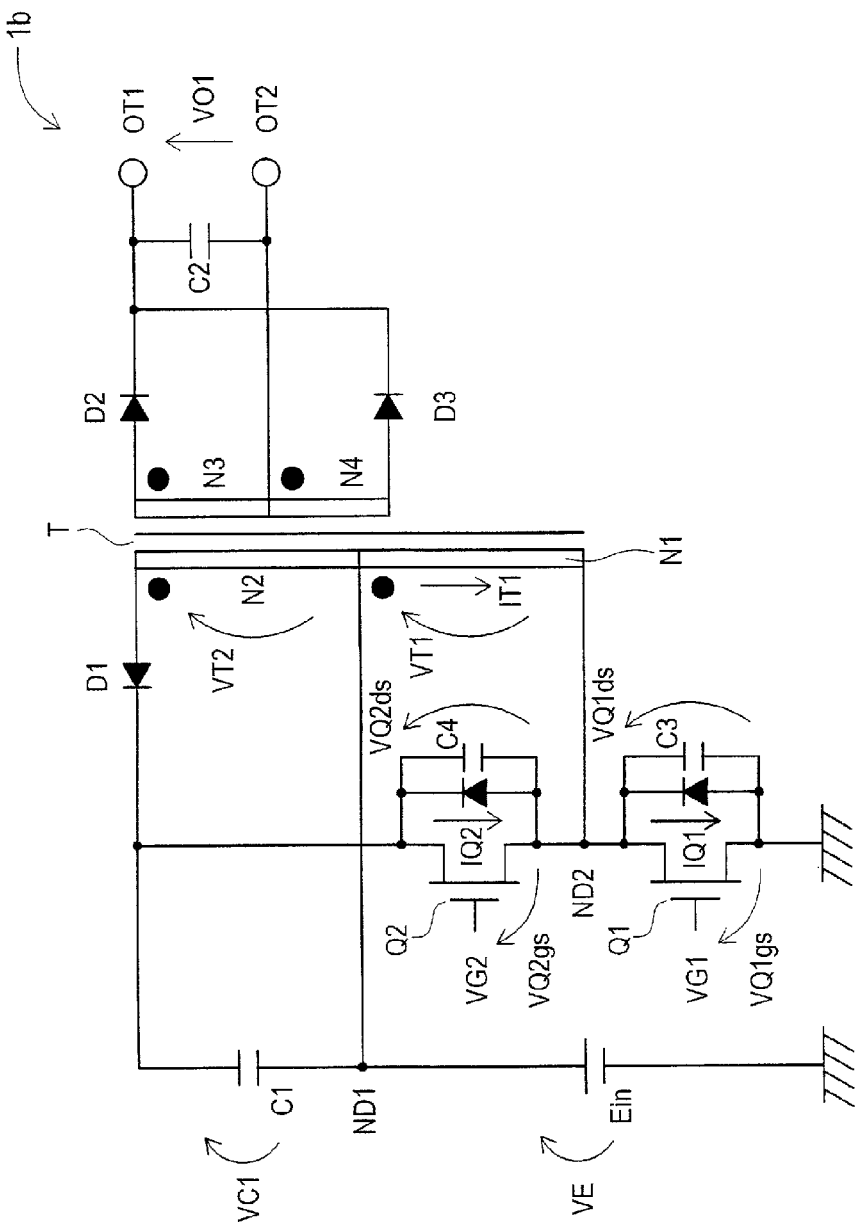
FIG. 8 is a circuit diagram showing a DC-DC converter 1b.
Figure 9:
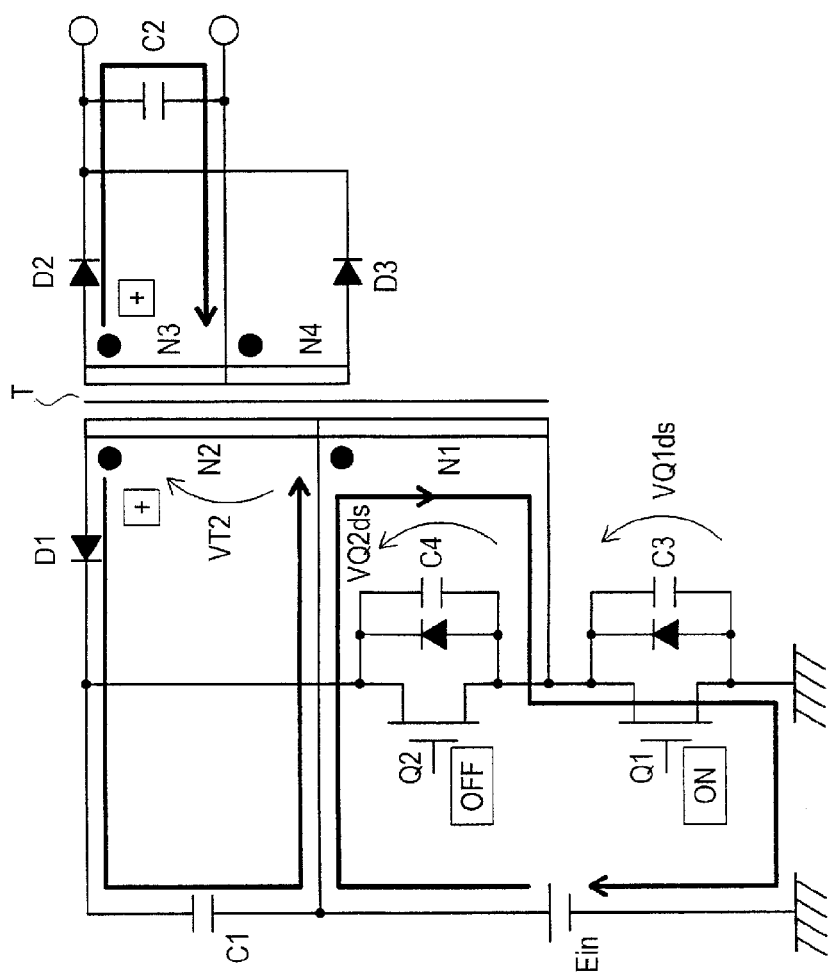
FIG. 9 is a figure showing an operating state of the DC-DC converter 1b (No. 1).

Hereafter, the second embodiment embodied about a DC-DC converter of the present invention will be explained in detail referring to the drawing on the basis of FIG. 8 to FIG. 15. FIG. 8 is a circuit diagram showing a DC-DC converter 1b according to this embodiment. A positive terminal of a direct-current power supply Ein is connected with a part of a condenser C1 that is a first condenser by the series on a node ND1 that is a connection point. A drain terminal of an NMOS type transistor Q1 that is a first semiconductor switch element is connected with a source terminal of an NMOS type transistor Q2 that is a second semiconductor switch element by the series on a node ND2 that is a connection point. Moreover, a condenser C3 that is a second condenser is connected with the transistor Q1 in parallel. Moreover, a condenser C4 that is a third condenser is connected with the transistor Q2 in parallel. Both a negative pole of the direct-current power supply Ein and a source terminal of the transistor Q1 are connected with the ground. Moreover, the other end of the condenser C1 is connected with a drain terminal of the transistor Q2. Control signals VG1 and VG2 from a controller (not shown in the figure) are input to gate terminals of the transistors Q1 and Q2. Here, the capacity of condenser C1 is adjusted to a large value of extent for which a power equal with a power supplied from the direct-current power supply Ein when the transistor Q1 is in the conduction state can be supplied when the transistor Q2 is the conduction state. Moreover, the capacity of the condenser C1 is assumed to be a high value enough compared with the capacity of the condenser C4. Moreover, the voltages between the source and the gate of the transistors Q1 and Q2 are referred to as VQ1$gs$ and VQ2$gs$ respectively. Moreover, the voltages between the drain and the source of the transistors Q1 and Q2 are assumed to be VQ1$ds$ and VQ2$ds$ respectively. Furthermore, the voltage of the direct-current power supply Ein is referred to as a voltage VE, and the both ends voltage of the condenser C1 is referred to as a voltage VC1. A relation that the sum of the VQ1$ds$ and VQ2$ds$ and the sum of the voltage (VE) of the direct-current power supply Ein and the voltage (VC1) of the condenser C1 become equal is approved.

The DC-DC converter 1b includes a transformer T. The transformer T includes a first coil N1 (number of turns is n1), a second coil N2 (number of turns is n2), and a third coils N3 and N4 (numbers of turns is n3 and n4). In this embodiment, a turn ratio n1:n2 of the coil N1 and the coil N2 is 1:1. One end of the coil N2 is connected with an anode terminal of a diode D1, and a cathode terminal of the diode D1 is connected with the condenser C1 and the transistor Q2. Moreover, one end of the coil N1 is connected with the node ND2. Moreover, the other end of the coil N1 and one end of the coil N2 are both connected with node ND1. Here, an electric current that flows to the coil N1 is referred to as IT1. Moreover, voltages of the coils N1 and N2 are referred to as VT1 and VT2 respectively. Moreover, electric currents that flow to the transistors Q1 and Q2 are referred to as IQ1 and IQ2 respectively.

Diodes D2 and D3 that configure a rectification circuit, a condenser C2 that configure a smoothing circuit, and output terminals OT1 and OT2 are connected with the third coils N3 and N4 of the transformer T. As for the coils N3 and N4, one end of the coil N3 and one end of the coil N4 are connected in a common terminal, which is connected with the output terminal OT2. The other end of the coil N3 is connected with an anode of the diode D2, and the other end of the coil N4 is connected with an anode of the diode D3. Cathodes of the diodes D2 and D3 is connected with the output terminal OT1. Moreover, the condenser C2 for smoothness is connected between the output terminals OT1 and OT2.

Next, an operation of the DC converter 1b according to the second embodiment will be explained. First of all, an operation at the start-up will be explained. Firstly, a charge to the condenser C1 is performed by the coil N2 and the diode D1 along with the start-up of the DC-DC converter 1b. Here, as for the charge of the condenser C1 at the start-up of the DC-DC converter 1b, a soft-start control is performed to prevent a rush current being generated in the condenser C1. The soft-start control is performed by gradually enlarging on a duty of the transistors Q1 and Q2 with a controlling circuit as not shown in the figure.

The charge to the condenser C1 is performed by the coil N2. Here, the value of the VC1 is decided by the turn ratio with the number of turns n1 of the coil N1 and the number of turns n1 of the coil N2. In this embodiment, the ratio of the number of turns is n1:n2=1:1. Therefore, the value of the VC1 rises to a value equal to the voltage (VE) of the direct-current power supply Ein.

Next, an operation at the stationary state of the DC-DC converter 1b will be explained by using FIG. 9 to FIG. 15. The operating state of the circuit in each operation is shown in FIG. 9 to FIG. 15. At time t1, the VQ1gs is a high level and the transistor Q1 conducts, and then it moves for a period (1).

At the period (1) (FIG. 9), when the transistor Q1 comes into the conduction state (turn-on), an exciting current flows from the direct-current power supply Ein to the coil N1 of the transformer T, and, as a result, the voltage is generated in the coils N2, N3, and N4. At this time, since the condenser C4 connected with the transistor Q2 in parallel is charged by voltage (2×VE), the VQ2ds is voltage (2×VE). Moreover, the VQ1ds is O(V).

The value of the VT2 is a value decided in the ratio of the number of turns for the coils N1 and N2. Since the turn ratio is 1:1 in this embodiment, the value of the VT2 reaches a value (VE) equal to the VT1. And then, a current path that passes the condenser C1 is established from the coil N2 through the diode D1, and the condenser C1 is charged.

Moreover, the voltage generated in the coils N3 and N4 of the transformer T is decided by the turn ratio with the coil N1. The voltage of ((n3·1n1)×VE) is generated in the coils N3 and N4 since it is equally set up the number of turns n3 and n4 in this embodiment. And then, the diode D2 comes into a conduction state and the diode D3 becomes a cut-off status, and a voltage is applied from the coil N3 to a load (as not shown in the figure) through the rectification circuit and the smoothing circuit.

Figure 10:
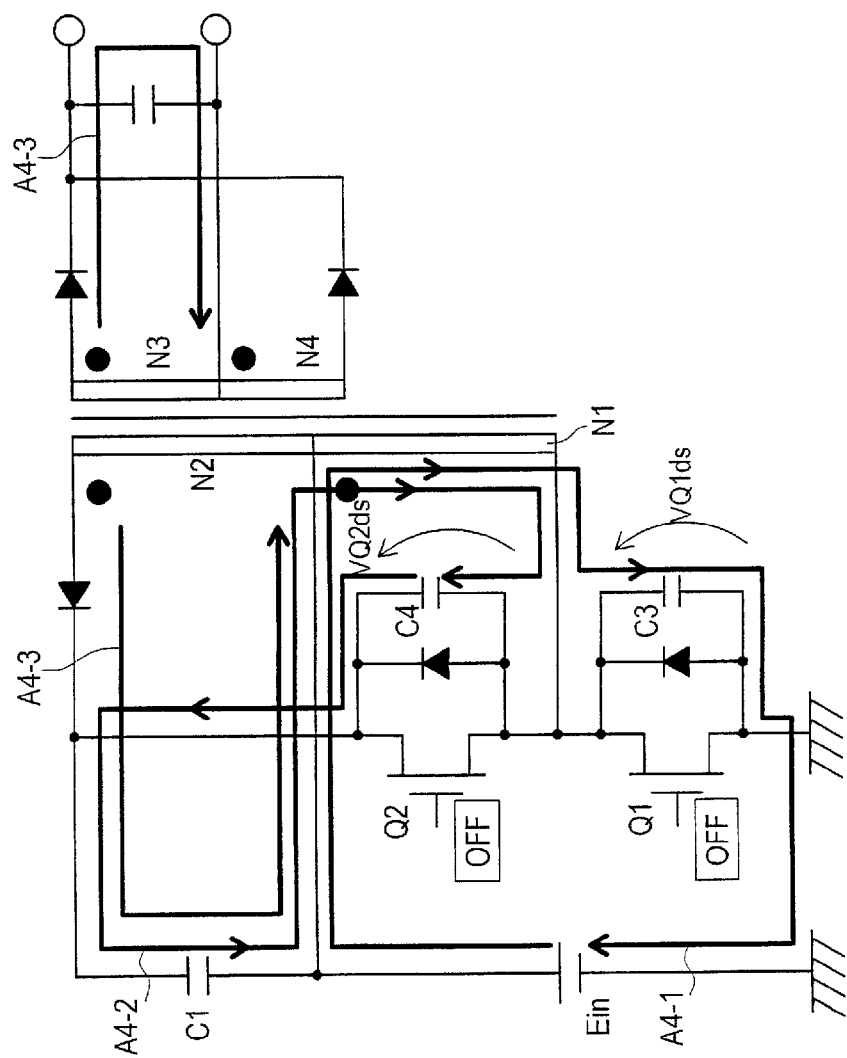
FIG. 10 is a figure showing an operating state of the DC-DC converter 1b (No. 2).
Figure 11:
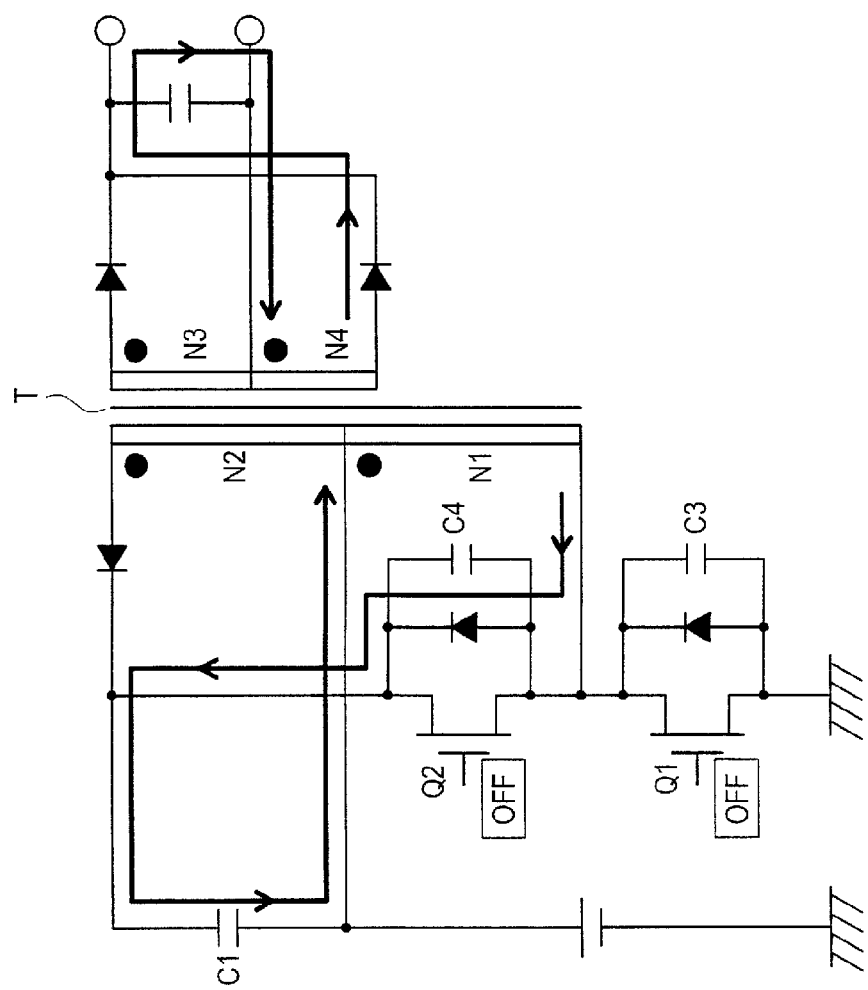
FIG. 11 is a figure showing an operating state of the DC-DC converter 1b (No. 3).

When the period when the transistor Q1 is turned ON elapses, the transistor Q1 comes into non-conduction state at time t2 since the gate voltage VQ1gs changes to the low level, and then it moves for a period (2) (FIG. 10 and FIG. 11). When the transistor Q1 is turned OFF, the electric current that flows to the transistor Q1 is shunted to the condenser C3 and charge of the condenser C3 is started, by continuity of the electric current that flows to the coil N1 of the transformer T (refer to arrow A4-1 of FIG. 10).

Here, when the condenser C3 was not provided, the switching losses had been occurred because of the electric current that flows to the transistor Q1 when the transistor Q1 had been turned OFF. However, the DC-DC converter 1b according to the present invention, by providing the condenser C3, firstly, since the electric current that flows to the transistor Q1 decreases when the transistor Q1 is turned OFF, it is possible to reduce the turn-off power losses in transistor Q1. Moreover, secondarily, since the energy stored in the coil N1 can be regenerated to the direct-current power supply Ein so that it may describe later, after storing in the condenser C3 once, it becomes possible to improve the conversion efficiency of the DC-DC converter 1b.

Moreover, the electric charge stored in the condenser C4 is discharged by the turn-off of the transistor Q1 by the path that passes the condenser C1 and the coil N1 (refer to arrow A4-2 of FIG. 10). As a result, the energy stored in the condenser C4 is transported to the condenser C1. Here, the energy that has been stored in the condenser C4 is energy stored by the electric current that flows to the coil N1 at the turn-off of the transistor Q2 of the previous cycle of operation. Moreover, the charge of the condenser C3 and the discharge of condenser C4 are performed so that the sum of the voltage of the condenser C3 and the voltage of the C4 may become equal to the sum (2×VE) of the voltage (VE) of the DC power supply Ein and the voltage (VE) of the condenser C1.

Moreover, during the period (2), since the coil N1 is excited until the energy stored in the leakage inductance is released, the electric current flows from the coil N2 to the condenser C1 and the electric current flows from the coil N3 to the load (refer to arrow A4-3 of FIG. 10).

When the condenser C3 is charged up to (2×VE), and the condenser C4 is discharged to O(V), the antiparallel diode of the transistor Q2 conducts, and the electric current that flows to the coil N1 flows in the condenser C1 and charges with the condenser C1, as shown in FIG. 11. Therefore, since the condenser C1 is charged by a part of the electric current that flows to the coil N1, and the energy is supplied to the load by the condenser C1 through the transformer T at a period (3) to be explained next, the conversion efficiency of the DC-DC converter improves.

Figure 12:
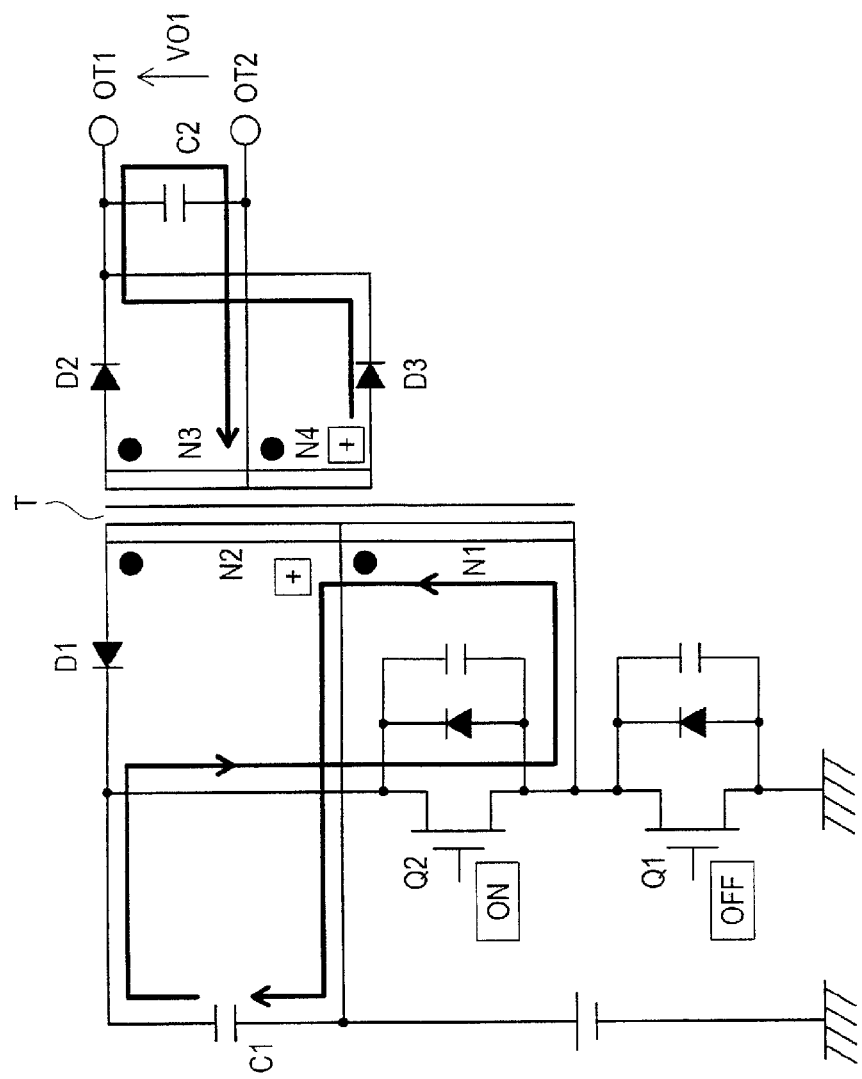
FIG. 12 is a figure showing an operating state of the DC-DC converter 1b (No. 4).

The transistor Q2 comes into a conduction state (turn-on) by changing the VQ2gs to the high level at time t3, and then it moves for the period (3) (FIG. 12). Time t3 is time when all the energy stored in the condenser C4 is regenerated to the condenser C1, and is time when the condenser C4 is made into the state where it does not charge. Therefore, since the VQ2ds is O(V), Zero Volt Switching (ZVS) is performed, and it is possible to reduce the switching losses.

Under such a condition, a current path that passes the transistor Q2 and the coil N1 of the transformer T from the condenser C1 is established, the exciting current flows from the condenser C1 to the coil N1 of the transformer T, and a voltage is generated in the coils N2, N3, and N4. At this time, the direction where the coil N1 is excited reverses compared with the case where the transistor Q1 comes into the conduction state. Therefore, since the polarity of the VT2 reverses the polarity when the transistor $1 is in the conduction state, the diode D1 becomes a cut-off status, and the charge path from the coil N2 to the condenser C1 is intercepted. Moreover, the diode D2 also becomes the cut-off status, and the diode D3 comes into the conduction state. Therefore, a voltage is applied from the coil N4 to the load (as not shown in the figure) through the rectification circuit and the smoothing circuit. At this time, the electric current that flows to the transistor Q2 and the coil N1 of the transformer T becomes a sum with the exciting current and (n4·1n1) times the electric current that flows to the coil N4.

Here, since condenser C1 is charged by the coil N2 and the diode D1 during "ON period of the transistor Q1, the energy that can supply energy equal to the direct-current power supply Ein in the "ON period of the transistor Q2 is stored in the condenser C1. As a result, since the difference of the voltage applied to the condenser C2 of the rectification smoothing circuit can be reduced between the "ON period (1) when the transistor Q1 conducts and the "ON period (3) when the transistor Q2 conducts, reducing the ripple of the output voltage V01 between the output terminals OT1 and OT2 becomes possible. Moreover, since the difference of the voltage applied to the condenser C2 at the period (1) and the period (3) can be reduced, the electric current that flows to the condenser C2 can be reduced, and it is possible to prevent the lifetime of the condenser C2 from shortening.

Figure 13:
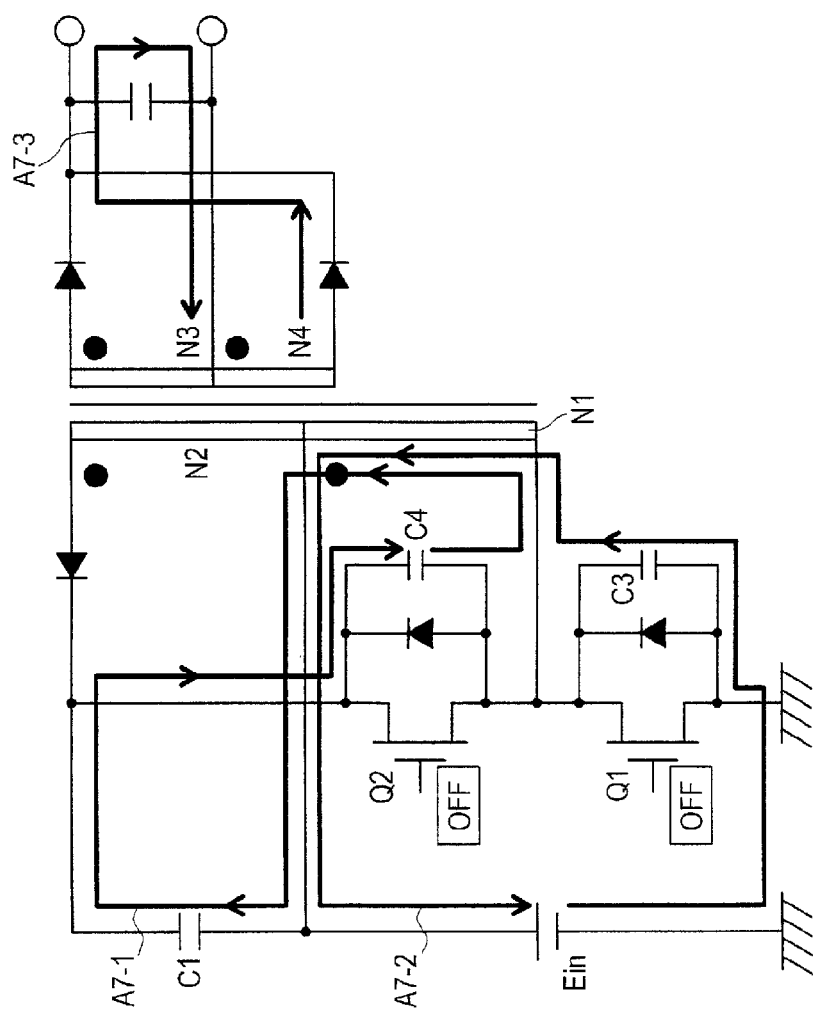
FIG. 13 is a figure showing an operating state of the DC-DC converter 1b (No. 5).
Figure 14:
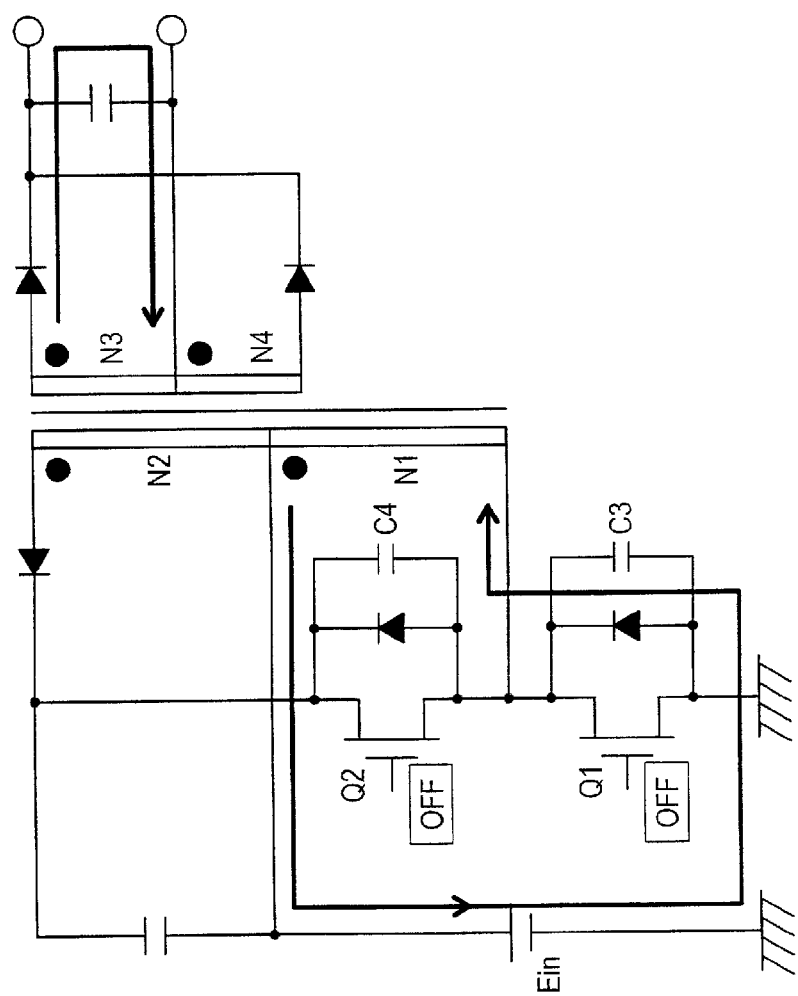
FIG. 14 is a figure showing an operating state of the DC-DC converter 1b (No. 6).

When the period when the transistor Q2 is turned ON elapses, the transistor Q2 comes into non-conduction state at time t4 since the VQ2gs changes to the low level, and then it moves for a period (4) (FIG. 13 and FIG. 14). When the transistor Q2 is turned OFF, the electric current that flows to the transistor Q2 is shunted to the condenser C4 by continuity of the electric current that flows to the coil N1 of the transformer T, and the condenser C4 charge is started (refer to arrow A7-1 of FIG. 13).

Like this by providing the condenser C4, firstly, since the electric current that flows to the transistor Q2 decreases when the transistor Q2 is turned OFF, it is possible to reduce the turn-off power losses in the transistor Q2. Moreover, secondarily, since it is possible to transport the energy consumed by the transistor Q2 to the condenser C1 so as describing later after storing it in the condenser C4 once, it becomes possible to improve the conversion efficiency of the DC-DC converter 1b.

Moreover, the energy stored in the condenser C3 is regenerated to the direct-current power supply Ein by the turn-off of the transistor Q2 (refer to arrow A7-2 of FIG. 13). Here, the energy that has been stored in the condenser C3 is energy stored when the transistor Q1 is turned OFF during the period (2). Moreover, the charge of the condenser C4 and the discharge of the condenser C3 are performed so that the sum of the voltage of the condenser C3 and the voltage of the condenser C4 may become equal to the sum (2×VE) of the voltage (VE) of the direct-current power supply Ein and the voltage (VE) of the condenser C1. Moreover, since the coil N1 is excited until the energy stored in the leakage inductance is released, during the period (4), the electric current flows from the coil N4 to the load (refer to arrow A7-3 of FIG. 13).

When the condenser C4 is charged up to (2×VE) and the condenser C3 is discharged to 0W), the antiparallel diode of the transistor Q1 conducts, and the electric current that flows to the coil N1 regenerates to the direct-current power supply Ein, as shown in FIG. 14. Therefore, since a part of the electric current that flows to the coil N1 is regenerated to the direct-current power supply Ein, the conversion efficiency of the DC-DC converter improves.

Figure 15:
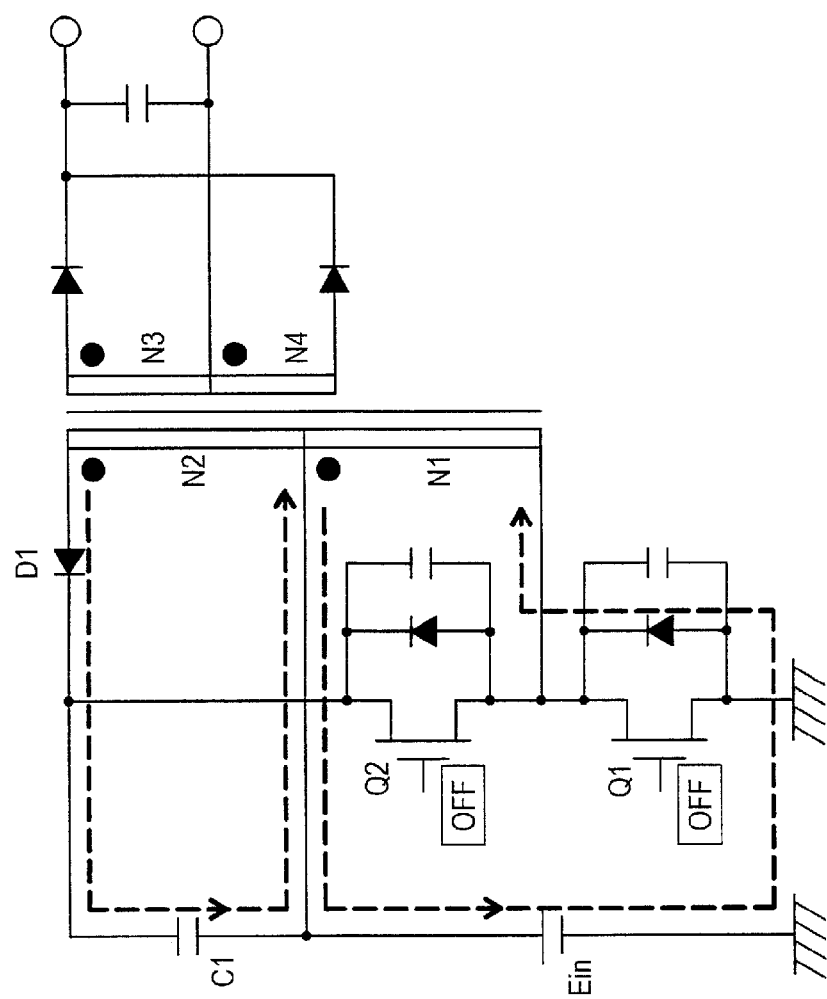
FIG. 15 is a figure showing an operating state of the DC-DC converter 1b (No. 7).

For a period (5) after the voltage of the VQ2$ds$ rises to sum (2×VE) of the voltage (VE) of the direct-current power supply Ein and the voltage (VE) of the condenser C1, the electric current that flows to the coil N1 flows by a path of either of a path that refreshes from the coil N1 to the direct-current power supply Ein through the transistor Q1 or a path that charges with the condenser C1 from the coil N2 through the diode D1 (FIG. 15). Incidentally, according to circuit composition etc., it is decided whether the exciting current will flow through which path.

By the VQ1$gs$'s transition to the high level at time t5, the transistor Q1 comes into a conduction state (turn-on), and it moves to the period (1). Time t5 is time when all the energy stored in the condenser C3 is refreshed to the direct-current power supply Ein, and is time when the condenser C3 is made into the state where it does not charge. Under such a condition, Zero Volt Switching (ZVS) is performed since the voltage VQ1$ds$ of the transistor Q1 between the drain and the source is 0(V), and it is possible to reduce the switching losses. Thereafter, the periods (1) through (5) are repeated.

As explained to the detail above, a DC-DC converter of the forward type of the new circuit is configured by the DC-DC converter 1b according to the second embodiment. In the DC-DC converter 1b, when the transistor Q1 is in non-conduction state, the electric current that flows to the transistor Q1 is shunted to the condenser C3. Moreover, when the transistor Q2 is in non-conduction state, the electric current that flows to the transistor Q2 is similarly shunted to the condenser C4. As a result, since the electric current that flows to the transistors Q1 and Q2 decrease when the transistors Q1 and Q2 are turned OFF, it becomes possible to reduce the turn-off power losses.

Moreover, in the DC-DC converter 1b, a part of the electric current that flows to the coil N1 is supplied to the charge of the condenser C3 when the transistor Q1 is turned OFF. And afterwards, when the transistor Q2 is turned OFF, the energy stored in the condenser C3 is refreshed to the direct-current power supply Ein. Moreover, a part of the electric current that flows to the coil N1 is similarly supplied to the charge of the condenser C4 when the transistor Q2 is turned OFF. And afterwards, the energy stored in the condenser C4 is transported to the condenser C1 when the transistor $1 is turned OFF. That is, since the energy etc. that have been stored in the coil N1 can refresh to the direct-current power supply Ein and the condenser C1 after storing it in the condensers C3 and C4 once, it becomes possible to improve the conversion efficiency of the DC-DC converter 1b. By carrying out turn-on of the transistor Q1 during the period when the condenser C3 is in a non-charge state, Zero Volt Switching (ZVS) is made possible. When the antiparallel diode of the transistor Q1 is in conduction state, the condenser C3 is in a non-charge state. However, even if the electric current that flows to the antiparallel diode of the transistor Q1 is discontinued before turn-on of the transistor Q1, the VQ1$ds$ at the time of turn-on of the transistor Q1 is lowered compared to the case where the condenser C3 is not provided, by the voltage retention function of the condenser C3. As a result, even if the electric current that flows to the antiparallel diode is discontinued before turn-on of the transistor Q1, the turn-on losses of the transistor Q1 can be reduced, compared to the case where the condenser C3 is not provided. Also, the turn-on losses of the transistor Q2 can be reduced by the condenser C4.

Moreover, by enlarging the capacity of the condenser C1 enough compared with the capacity of the condenser C4, it is possible to reduce variation which occurs on the voltage of the condenser C1 when the electric charge stored in the condenser C4 is transported to the condenser C1. As a result, since the supply current from the first condenser C1 to the coil N1 can be held to a definite value, it is possible to reduce the ripple of the electric current supplied to the circuit of the secondary side.

Figure 16:
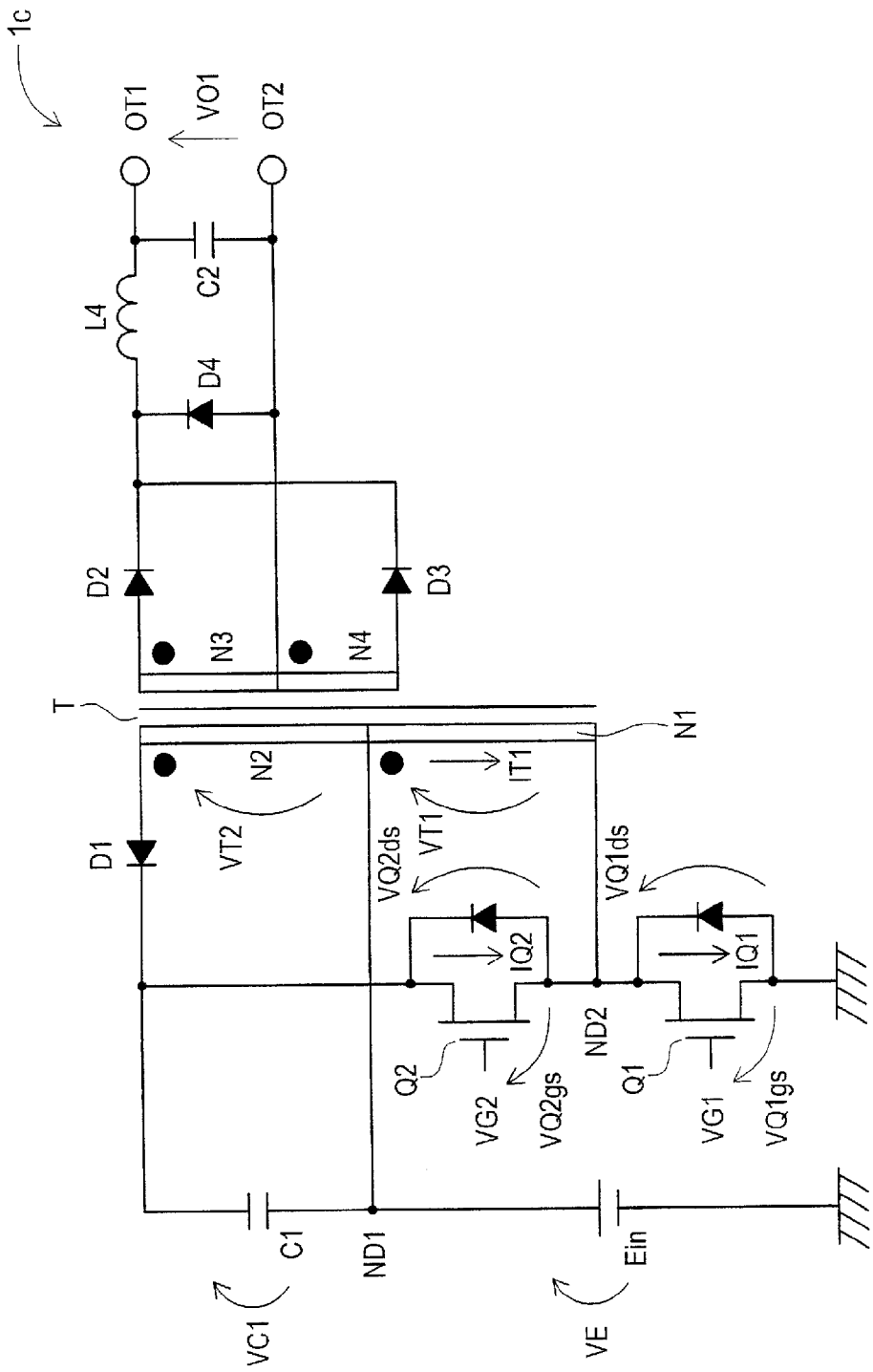
FIG. 16 is a circuit diagram showing a DC-DC converter 1c.
Figure 17:
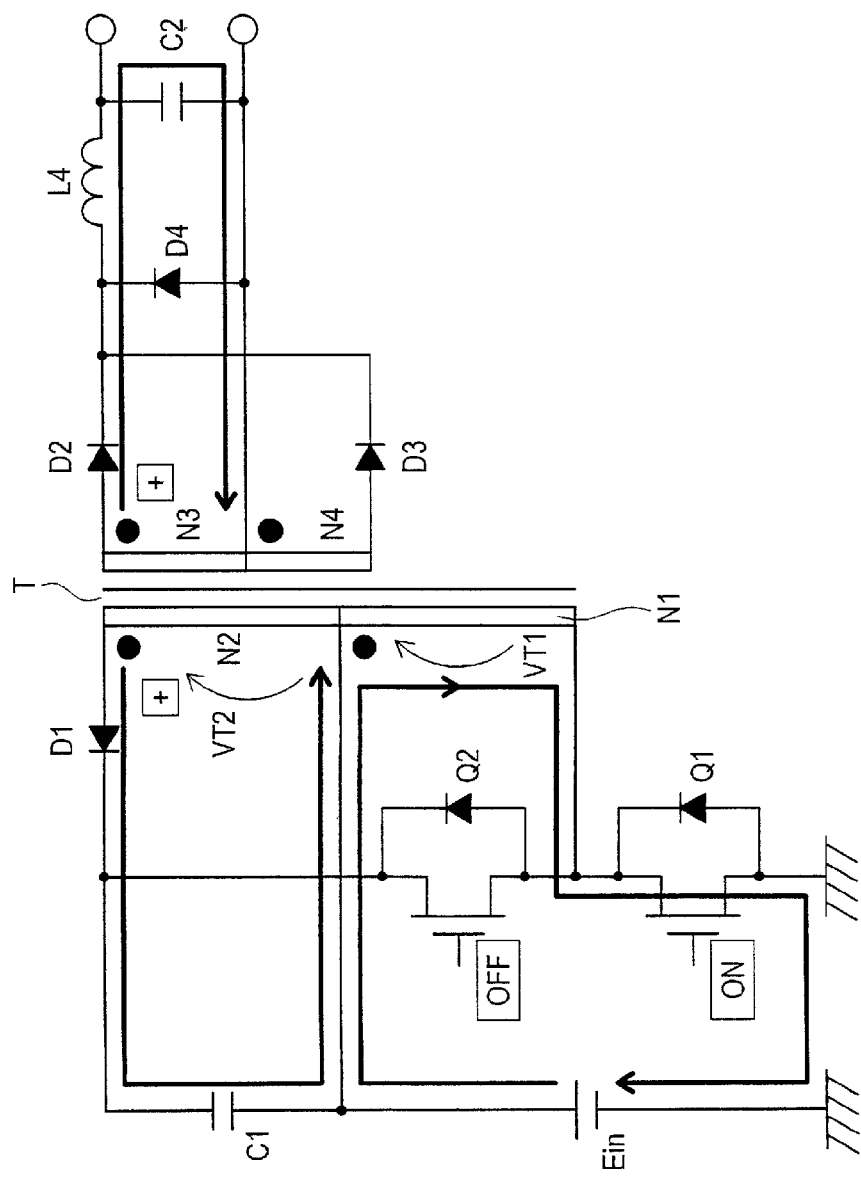
FIG. 17 is a figure showing an operating state of the DC-DC converter 1c (No. 1).

FIG. 16 is a circuit diagram showing a DC-DC converter 1c according to the third embodiment. In addition to the secondary side of the DC-DC converter 1 of the first embodiment as shown in FIG. 1, the DC-DC converter 1c is provided with a commutation diode D4 and a smoothing coil L4 at the secondary side thereof. The anode of the commutation diode D4 is connected to a common terminal of the coils N3 and N4 and the output terminal T2. The cathode of the commutation diode D4 is connected to a common connection point of the cathode of the diode D2 and the cathode of the diode D3 as well as to one end of the smoothing coil L4. The other end of the smoothing coil is connected to the output terminal OT1. Incidentally, other constructions are similar to those of the DC-DC converter 1 of the first embodiment and thus the detailed description thereof will be omitted here.

An operation at the stationary state of the DC-DC converter 1c will be explained by using FIG. 17 to FIG. 21. At time t1, the VQ1$gs$ of the transistor Q1 is a high level and the transistor Q1 conducts, and then it moves for a period (1).

At the period (1) (FIG. 17), when the transistor Q1 comes into the conduction state (turn-on), an exciting current flows from the direct-current power supply Ein to the coil N1 of the transformer T, and thereby the voltage is generated in the coils N2, N3, and N4. The value of the VT2 is a value decided in the ratio of the number of turns for the coils N1 and N2. Since the turn ratio is 1:1 in this embodiment, the value of the VT2 reaches a value (VE) equal to the VT1. And then, a current path that passes the condenser C1 is established from the coil N2 through the diode D1, and the condenser C1 is charged.

Moreover, the voltage generated in the coils N3 and N4 of the transformer T is decided by the turn ratio with the coil N1. The voltage of ((n31n1)×VE) is generated in the coils N3 and N4 since it is equally set up the number of turns n3 and n4 in this embodiment. And then, the diode D2 comes into a conduction state as well as the diode D3 becomes a cut-off state, and a voltage is applied from the coil N3 to a load (as not shown in the figure) through the rectification circuit and the smoothing circuit. At this time, the electric current flows from the coil N3 through the diode D2 and the smoothing coil L4 to the not-shown load as well as the energy is stored in the smoothing coil L4.

Figure 18:
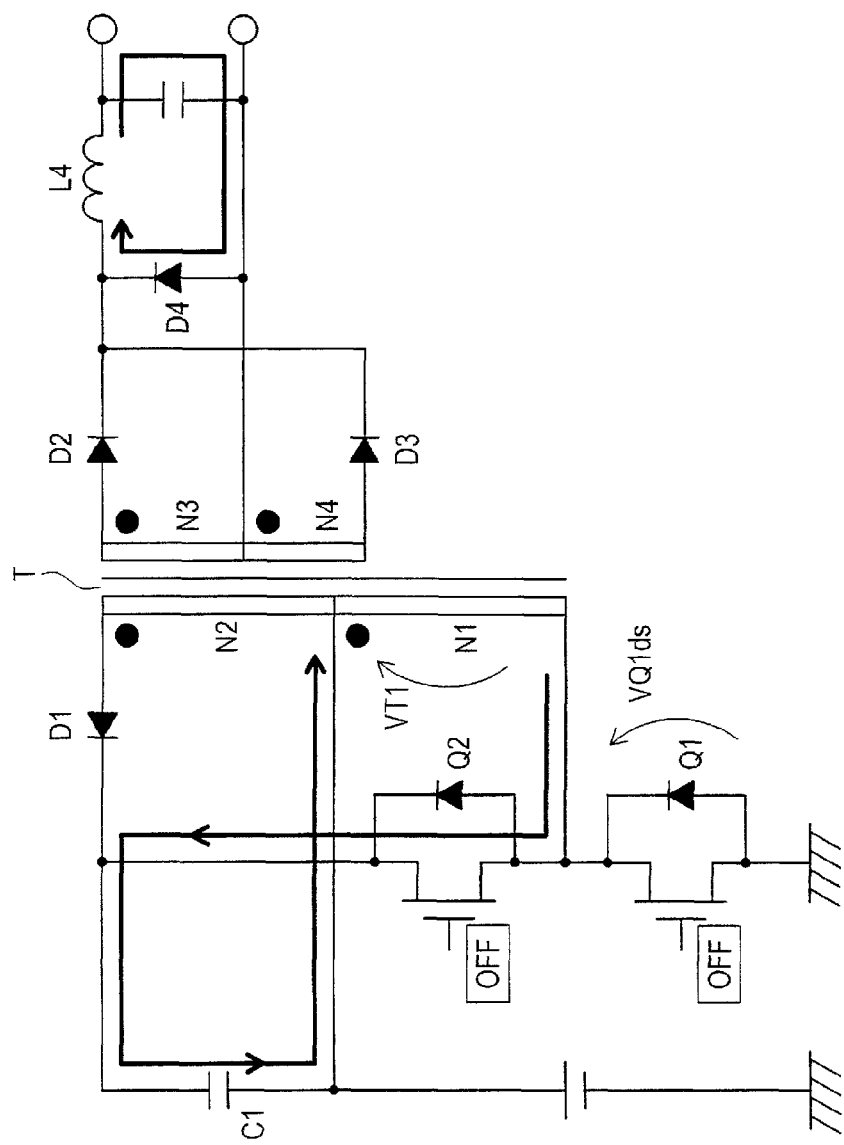
FIG. 18 is a figure showing an operating state of the DC-DC converter 1c (No. 2).

When the period when the transistor Q1 is turned ON elapses, the transistor Q1 comes into non-conduction state at time t2 since the VQ1$gs$ changes to the low level, and then it moves for a period (2) (FIG. 18). In the period (2), the transistor Q1 and the transistor Q2 are brought into the non-conduction state, so that energy is not supplied to the secondary side of the transformer T. However, an electric current path that passes from the smoothing coil L4 through the load to the commutation diode D4 and goes back to the smoothing coil L4 is established and thereby the energy stored in the smoothing coil L4 is supplied to the load. In other words, the electric current keeps flowing to the load by the consecutiveness of the electric current flowing to the smoothing coil L4. In addition, output voltages are leveled off by the smoothing coil L4 and the condenser C2.

Figure 19:
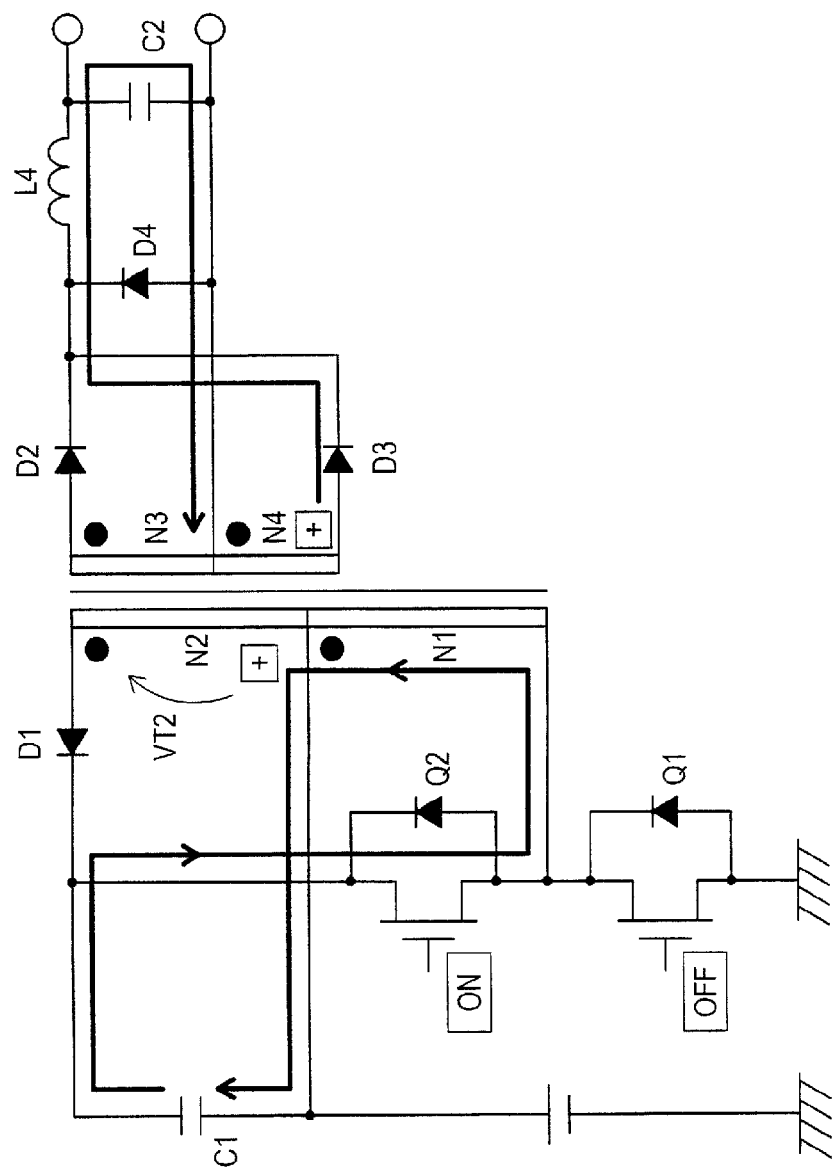
FIG. 19 is a figure showing an operating state of the DC-DC converter 1c (No. 3).

The transistor Q2 comes into a conduction state (turn-on) by changing the VQ2$gs$ to the high level at time t3, and then it moves for a period (3) (FIG. 19). Under such a condition, a current path that passes the transistor Q2 and the coil N1 of the transformer T from the condenser C1 is established, the exciting current flows from the condenser C1 to the coil N1 of the transformer T, and a voltage is generated in the coils N2, N3, and N4. At this time, the direction where the coil N4 is excited reverses compared with the case where the transistor Q1 comes into the conduction state. As a result, the diode D2 becomes the cut-off status, and the diode D3 comes into the conduction state. Therefore, a voltage is applied from the coil N4 to the load (as not shown in the figure) through the diode D3 and the smoothing coil L4. At this time, an electric current flows from the coil N4 to the not-shown load through the diode D3 and the smoothing coil L4 and at the same time energy is stored in the smoothing coil L4.

Figure 20:
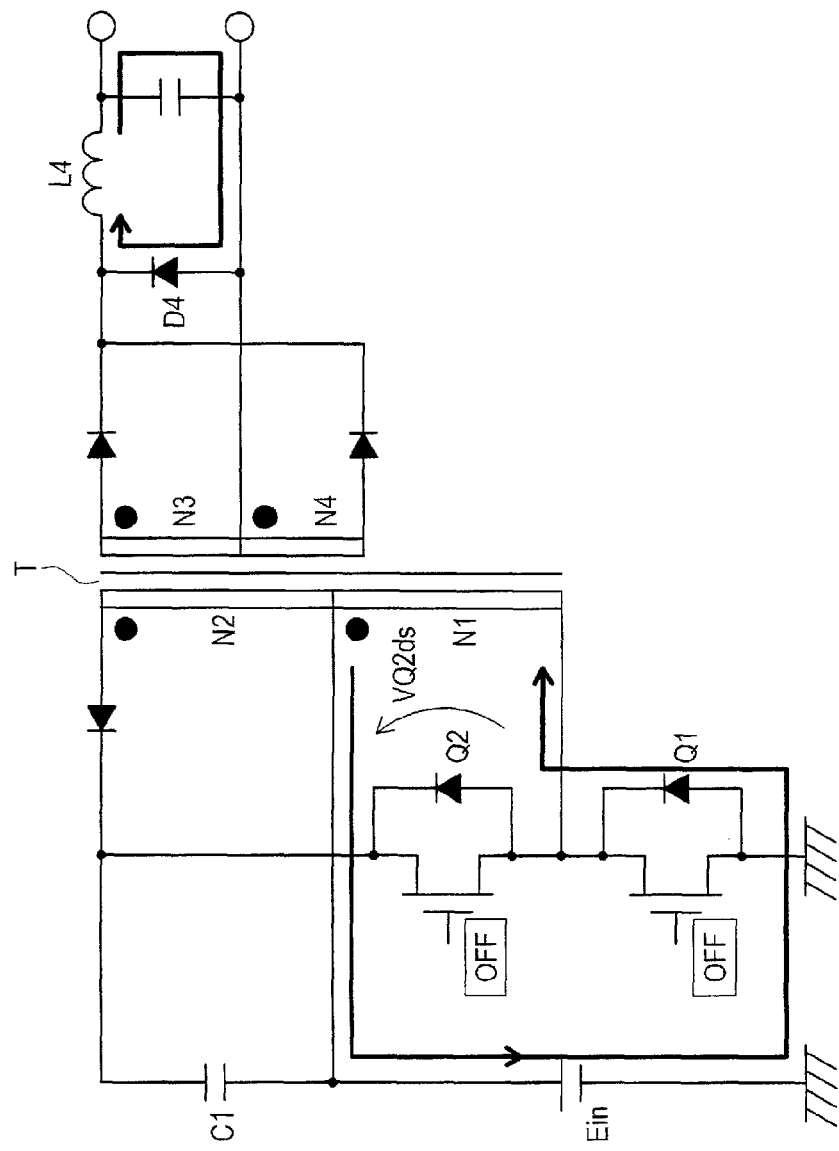
FIG. 20 is a figure showing an operating state of the DC-DC converter 1c (No. 4).

When the period when the transistor Q2 is turned ON elapses, the transistor Q2 comes into non-conduction state at time t4 since the VQ2$gs$ changes to the low level, and then it moves for a period (4) (FIG. 20). In the period (4), the transistors Q1 and Q2 are brought into the non-conduction state similar to the period (2) and the energy is not supplied to the secondary side of the transformer T. However, an electric current path that passes from the smoothing coil L4 through the load and the commutation diode D4 to go back to the smoothing coil L4 is established so that the energy stored in the smoothing coil L4 is supplied to the load. That is, the consecutiveness of the electric current flowing to the smoothing coil L4 makes the electric current keep flowing to the load. Also, due to the smoothing coil L4 and the condenser C2, output voltages are leveled off.

Figure 21:
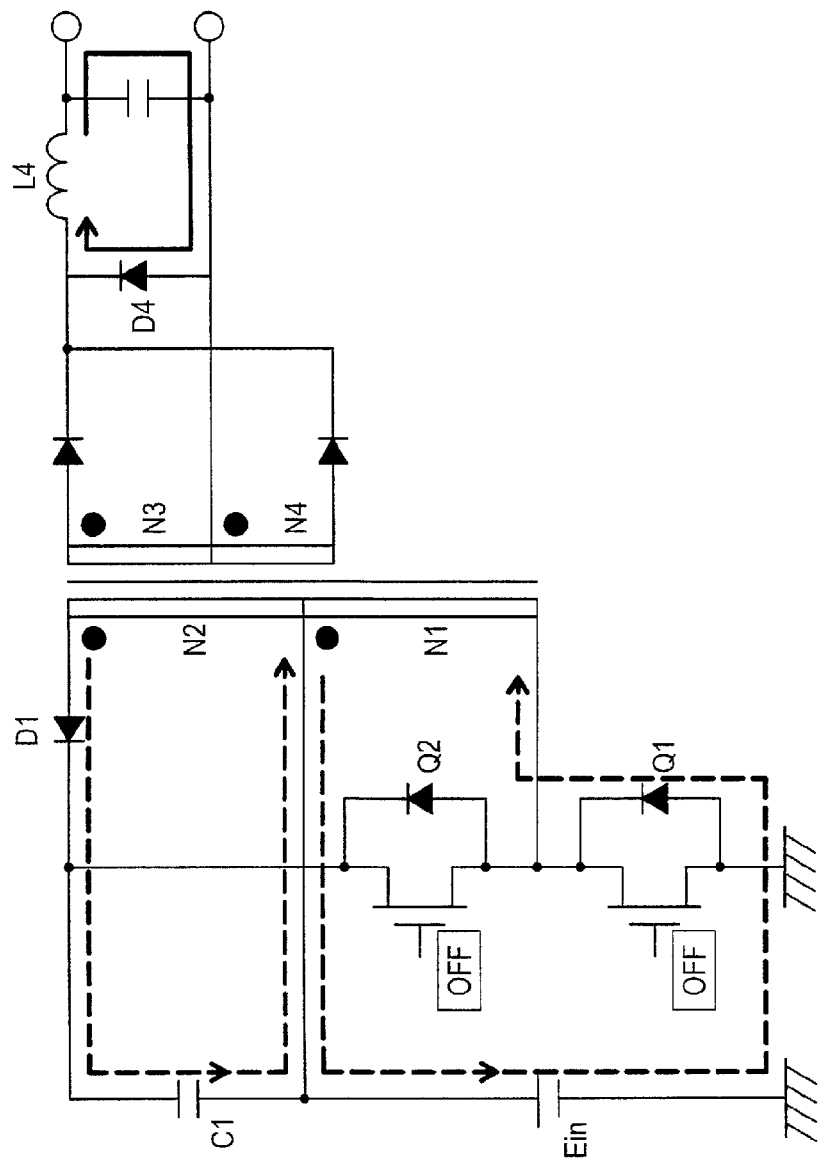
FIG. 21 is a figure showing an operating state of the DC-DC converter 1c (No. 5).

The electric current that flows to the coil N1 in the period (5) after the voltage of the VQ2$ds$ reaches sum (2×VE) of the voltage (VE) of the direct-current power supply Ein and the voltage (VE) of the condenser C1 flows along either a path in which it is regenerated from the coil N1 through the transistor Q1 to the direct-current power supply Ein or a path that it flows from the coil N2 through the diode D1 to charge the condenser C1 (FIG. 21). Also in the period (5), the energy stored in the smoothing coil L4 is supplied to the load by an electric current path that passes from the smoothing coil L4 through the load and the commutation diode D4 to go back to the smoothing coil L4.

By the VQ1$gs$'s transition to the high level at time t5, the transistor $1 comes into a conduction state (turn-on) and it moves to the period (1). Thereafter, the periods (1) through (5) are repeated.

As explained to the detail above, in the DC-DC converter 1$c$ according to the third embodiment, the energy stored in the smoothing coil L4 can be supplied to the load even in the periods (2) and (4) in which the transistors Q1 and Q2 are both in a non-conducting state. Also, since the voltages generated in the coils N3 and N4 can be leveled off by the smoothing coil L4 and the condenser C2, output voltages can be controlled by adjusting duties of the transistors Q1 and Q2.

Figure 22:
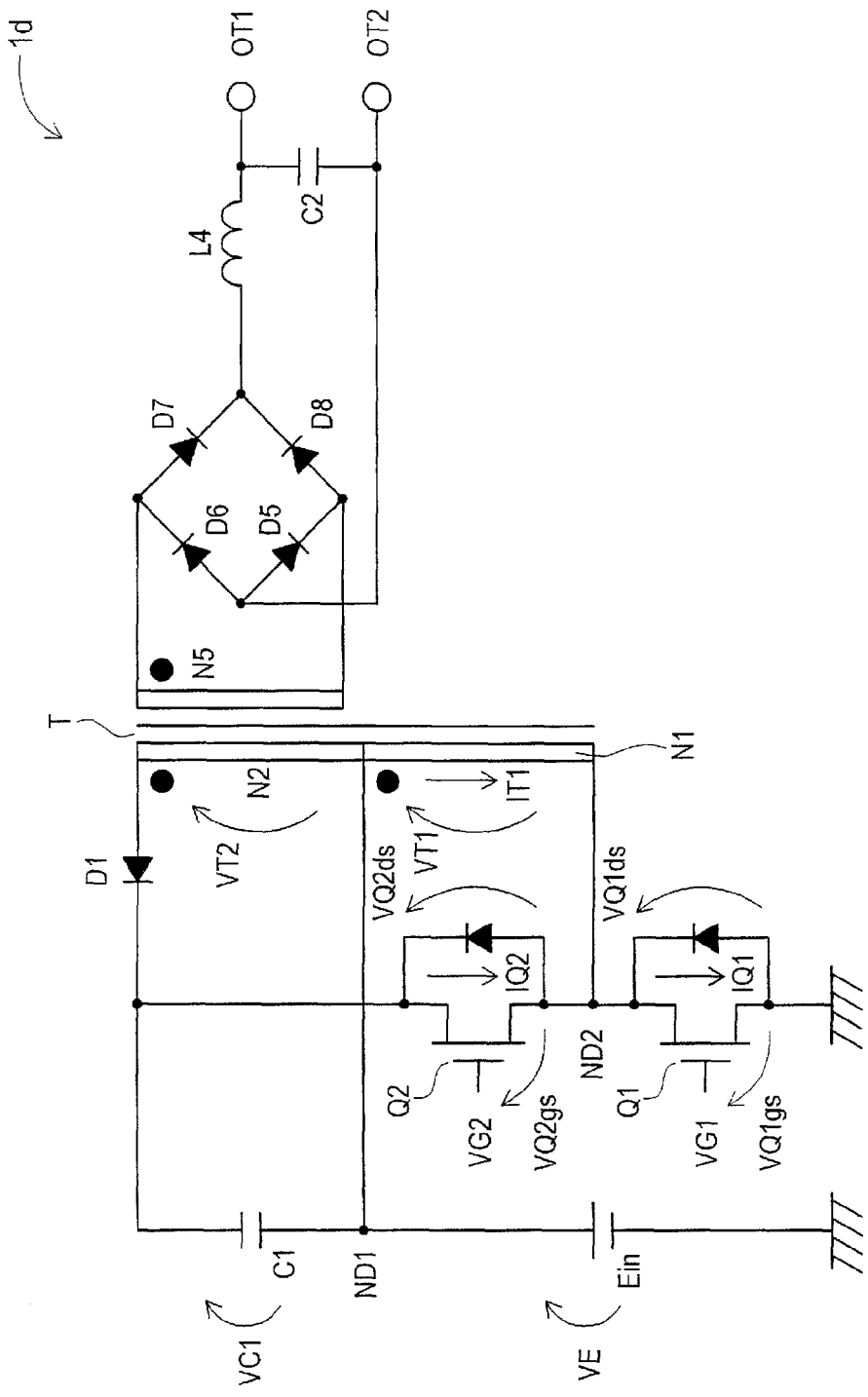
FIG. 22 is a circuit diagram showing a DC-DC converter id.
Figure 23:
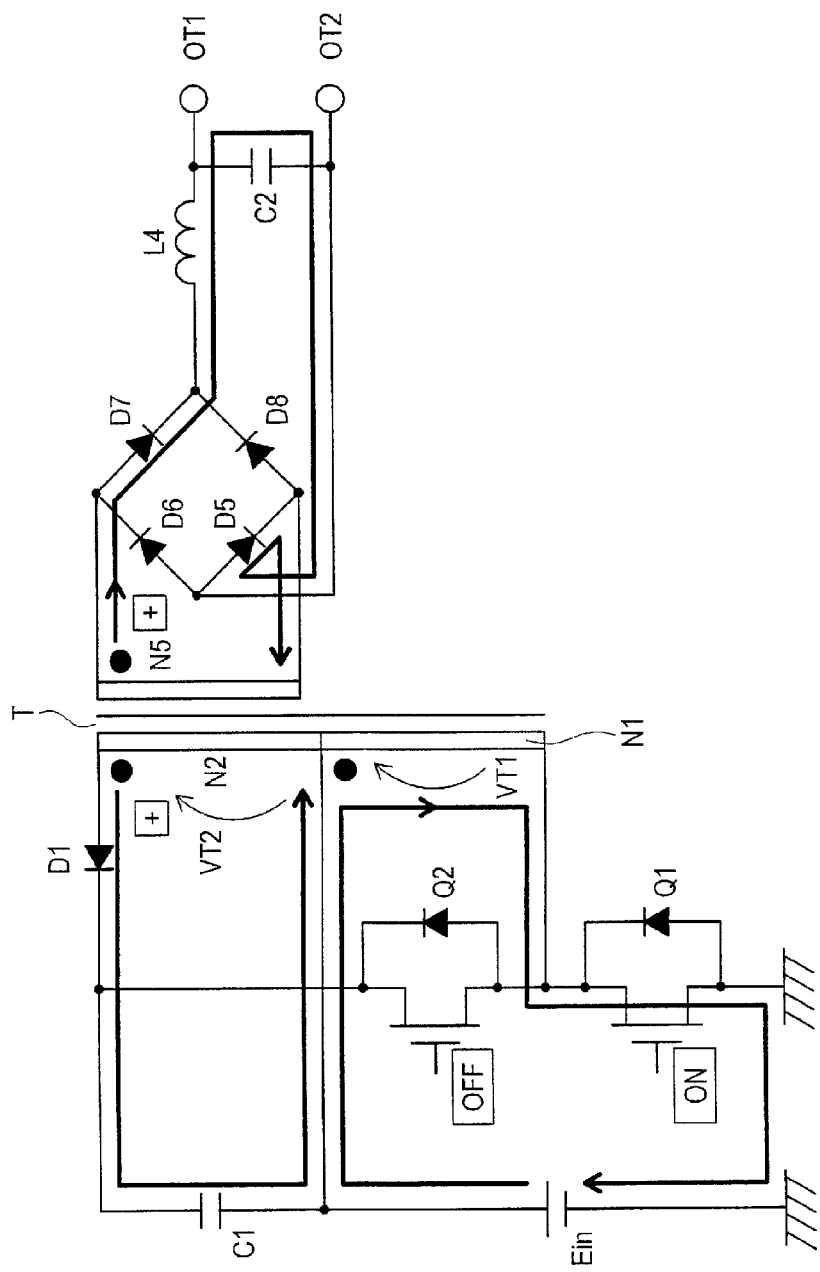
FIG. 23 is a figure showing an operating state of the DC-DC converter id (No. 1).

FIG. 22 is a circuit diagram of a DC-DC converter id according to the fourth embodiment. The secondary side of the DC-DC converter id is provided with a diode bridge composed of diodes D5 to D8 instead of the diodes D2 and D3 at the secondary side of the DC-DC converter 1 according to the first embodiment. Also, a smoothing coil L4 is provided at the secondary side of the DC-DC converter id.

The anode of the diode D5 and the anode of the diode D6 are connected in common to an output terminal OT2. Also, the cathode of the diode D7 and the cathode of the diode D8 are connected in common to one end of the smoothing coil L4. The cathode of the diode D6 and the anode of the diode D7 are connected in common to one end of the coil N5. Also, the cathode of the diode D5 and the anode of the diode D8 are connected in common to the other end of the coil N5. Also, the other end of the smoothing coil L4 is connected to an output terminal OT1. Incidentally, other constructions are similar to those of the DC-DC converter 1 of the first embodiment and thus the detailed description thereof will be omitted here.

Next, an operation at the stationary state of the DC-DC converter id according to the fourth embodiment will be explained by using FIG. 23 to FIG. 27. At time t1, the VQ1$gs$ of the transistor Q1 is a high level and the transistor Q1 conducts, and then it moves for a period (1).

At the period (1) (FIG. 23), when the transistor Q1 comes into the conduction state (turn-on), an exciting current flows from the direct-current power supply Ein to the coil N1 of the transformer T, and as a result the voltage is generated in the coils N2 and N5.

The value of the VT2 is a value decided in the ratio of the number of turns for the coils N1 and N2. Since the turn ratio is 1:1 in this embodiment, the value of the VT2 reaches a value (VE) equal to the VT1. And then, a current path that passes the condenser C1 is established from the coil N2 through the diode D1, and the condenser C1 is charged.

Moreover, the voltage generated in the coils N5 of the transformer T is decided by the turn ratio with the coil N1. Then, the diodes D7 and D5 are brought into conduction state and at the same time the diodes D6 and D8 become a cut-off status. A current path that passes from the coil N5 through the diode D7, the smoothing coil L4, the load and the diode D5 to return to the coil N5 is established, so that power is supplied to the load. Also, the energy is stored in the smoothing coil L4. In this time, the diodes D7 and D5 that constitute the diode bridge function as the diode of the rectification circuit.

Figure 24:
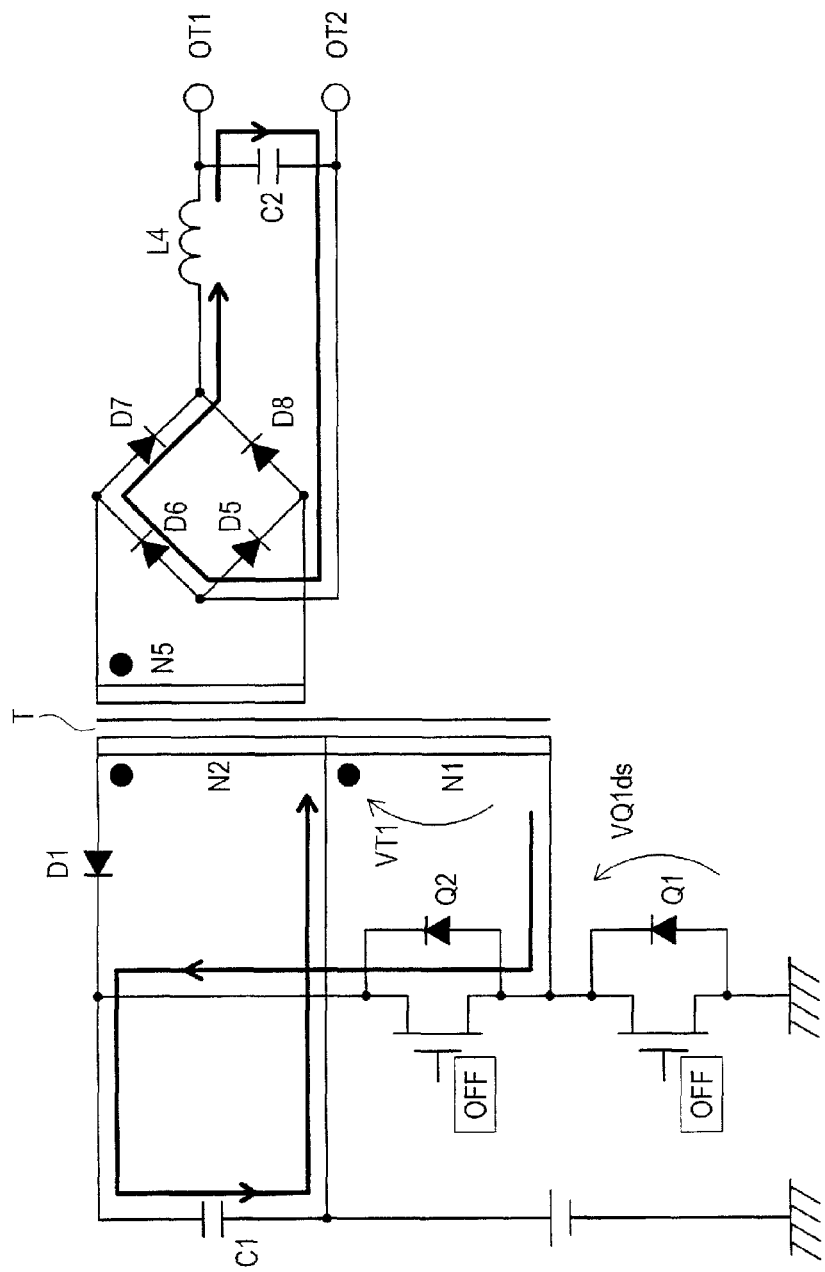
FIG. 24 is a figure showing an operating state of the DC-DC converter id (No. 2).

When the period when the transistor Q1 is turned ON elapses, the transistor Q1 comes into non-conduction state at time t2 since the VQ1$gs$ changes to the low level, and then it moves for a period (2) (FIG. 24). In the period (2), the transistor Q1 and the transistor Q2 are brought into the non-conduction state, so that energy is not supplied to the load from the coil N5 of the transformer T. However, an electric current path that passes from the smoothing coil L4 through the load, the diodes D6 and D7 to go back to the smoothing coil L4 is established and thereby the energy stored in the smoothing coil L4 is supplied to the load. In other words, electric current keeps flowing to the load by the consecutiveness of the electric current flowing to the smoothing coil L4. In addition, output voltages are leveled off by the smoothing coil L4 and the condenser C2. In the period (2), the diodes D6 and D7 that constitute the diode bridge serve as a commutation diode for establishing the electric current path.

Figure 25:
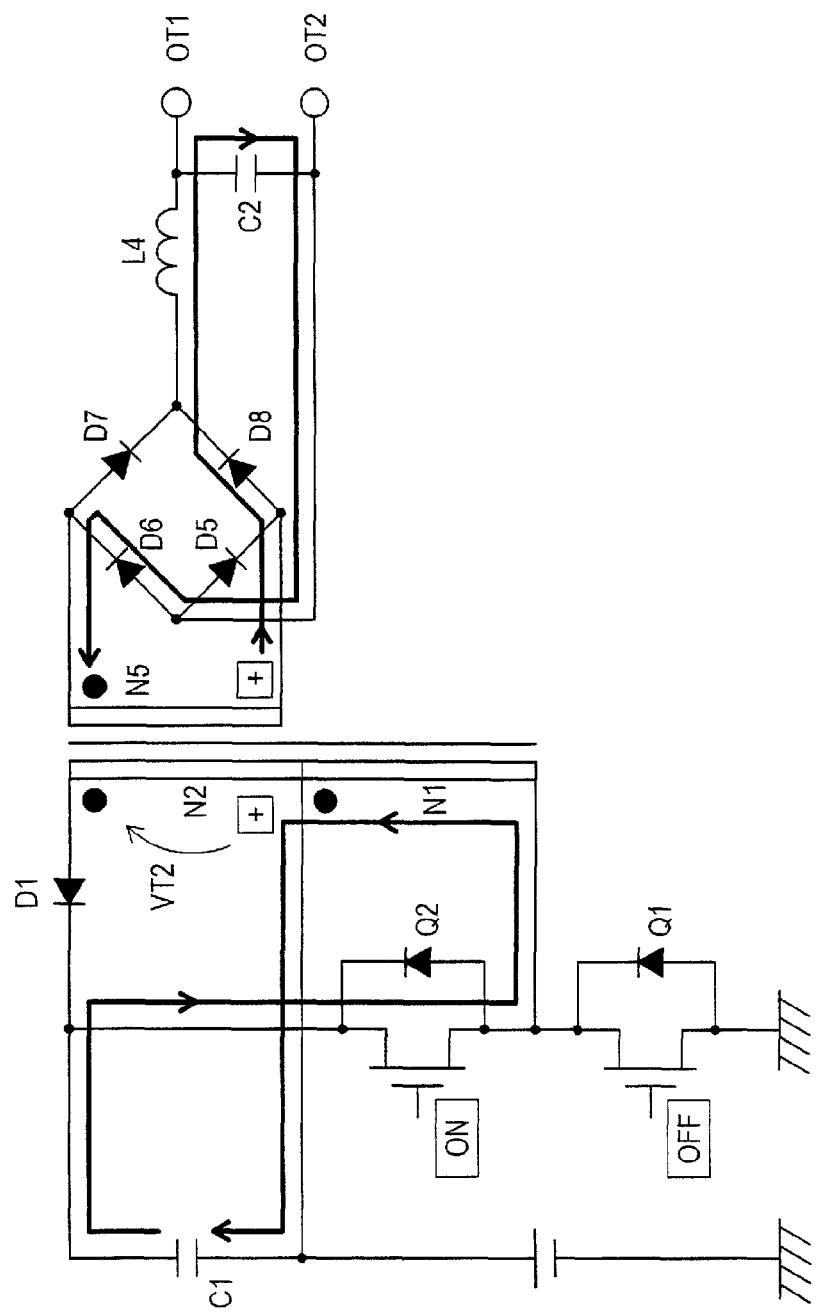
FIG. 25 is a figure showing an operating state of the DC-DC converter id (No. 3).

The transistor Q2 conducts (turn-on) by changing the VQ2gs to the high level at time t3, and then it moves for a period (3) (FIG. 25). Under such a condition, a current path that passes the transistor Q2 and the coil 15 N1 of the transformer T from the condenser C1 is established, the exciting current flows from the condenser C1 to the coil N1 of the transformer T, and a voltage is generated in the coils N2 and N5. At this time, the direction where the coil N5 is excited reverses compared with the case where the transistor Q1 comes into the conduction state. As a result, an electric current path that passes from the coil N5 through the diode D8, the smoothing coil L4, the load and the diode D6 to go back to the coil N5 is established. Accordingly, an electric current flows to the not-shown load and energy is stored in the smoothing coil L4. In this time, the diodes D8 and D6 that constitute the diode bridge function as the diode of the rectification circuit.

Figure 26:
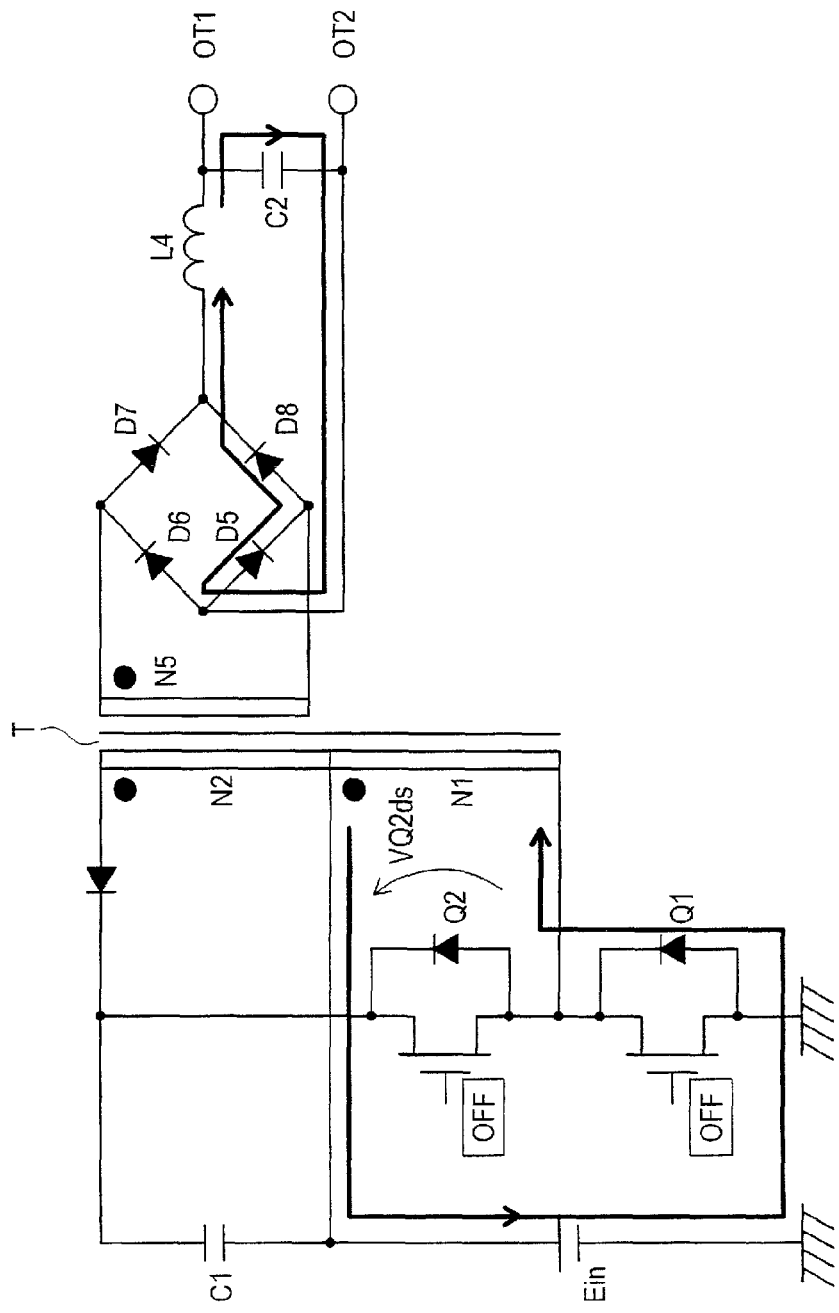
FIG. 26 is a figure showing an operating state of the DC-DC converter id (No. 4).

When the period when the transistor Q2 is turned ON elapses, the transistor Q2 comes into non-conduction state at time t4 since the VQ2gs changes to the low level, and then it moves for a period (4) (FIG. 26). In the period (4), the transistors Q1 and Q2 are brought into the non-conduction state and the energy is not supplied to the load from the coil N5 of the transformer T. However, an electric current path that passes from the smoothing coil L4 through the load, the diodes D5 and D8 to go back to the smoothing coil L4 is established so that the energy stored in the smoothing coil L4 is supplied to the load. That is, in the period (4), the diodes D5 and D8 that constitute the diode bridge function as the commutation diode for establishing the electric current path.

Figure 27:
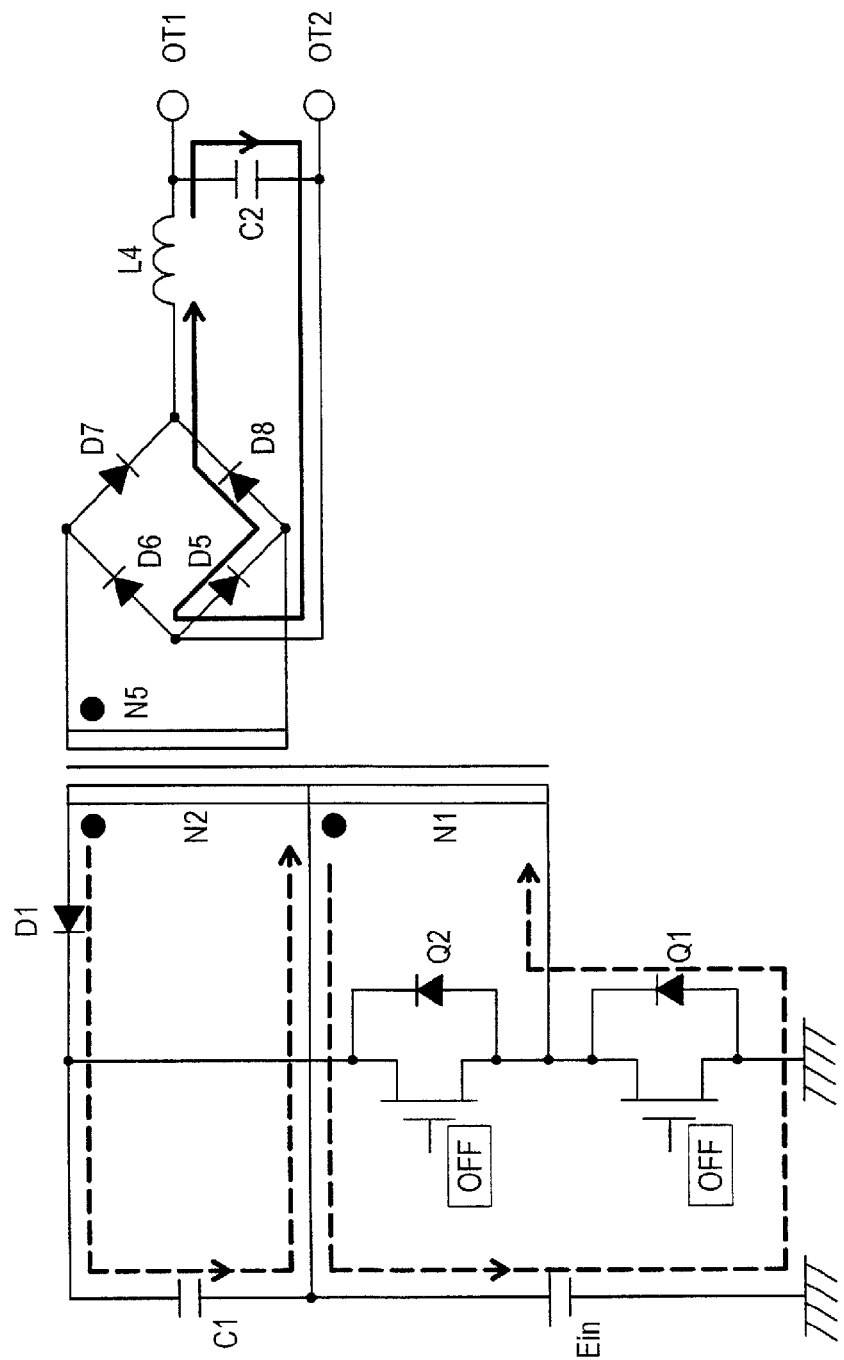
FIG. 27 is a figure showing an operating state of the DC-DC converter id (No. 5).

The electric current that flows to the coil N1 in the period (5) after the voltage of the VQ2ds reaches sum (2×VE) of the voltage (VE) of the direct-current power supply Ein and the voltage (VE) of the condenser C1 flows along either a path in which it is regenerated from the coil N1 through the transistor Q1 to the direct-current power supply Ein or a path that it flows from the coil N2 through the diode D1 to charge the condenser C1 (FIG. 27). Also in the period (5), the energy stored in the smoothing coil L4 is supplied to the load by an electric current path that passes from the smoothing coil L4 through the load and the diodes D5 and D8 to go back to the smoothing coil L4.

By the VQ1gs's transition to the high level at time t5, the transistor Q1 comes into a conduction state (turn-on) and it moves to the period (1). Thereafter, the periods (1) through (5) are repeated.

As explained to the detail above, in the DC-DC converter id according to the fourth embodiment, the energy stored in the smoothing coil L4 is supplied to the load even in the periods (2) and (4) in which the transistors Q1 and Q2 are both in a non-conducting state. Also, since the voltages generated in the coils N5 can be leveled off by the smoothing coil L4 and the condenser C2, output voltages can be controlled by adjusting duties of the transistors Q1 and Q2.

In addition, the DC-DC converter id of the fourth embodiment does not require the middle terminal of the coil N5 by using the diode bridge to thereby achieve miniaturization of the transformer T. Also, a pair of the diodes D6 and D7 and a pair of the diode D5 and D8 that constitute the diode bridge are used as a commutation diode.

Figure 28:
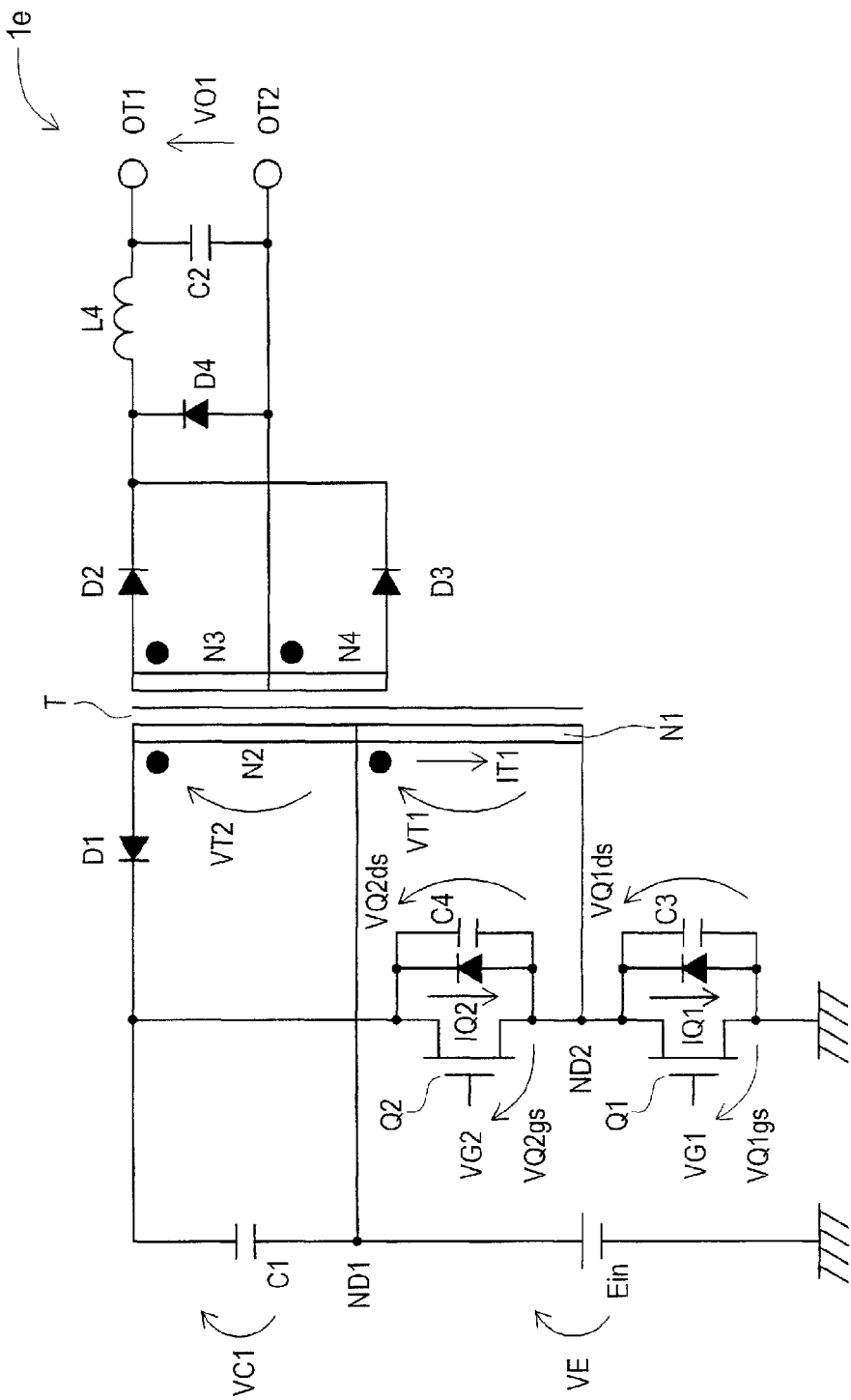
FIG. 28 is a circuit diagram showing a DC-DC converter 1e.

FIG. 28 is a circuit diagram of a DC-DC converter 1e according to the fifth embodiment. In the circuits of the DC-DC converter 1e, the circuit connected to the coils N1 and N2 of the transformer T is the same as that of the DC-DC converter 1b according to the second embodiment as shown in FIG. 8 and the circuit connected to the coils N3 and N4 of the transformer is the same as that of the DC-DC converter 1c according to the third embodiment as shown in FIG. 16. In the DC-DC converter 1e, it is possible to improve conversion efficiency similarly to the converter 1b. Also, similarly to the converter 1c, output voltages can be controlled by adjusting the duties of the transistors Q1 and Q2.

Figure 29:
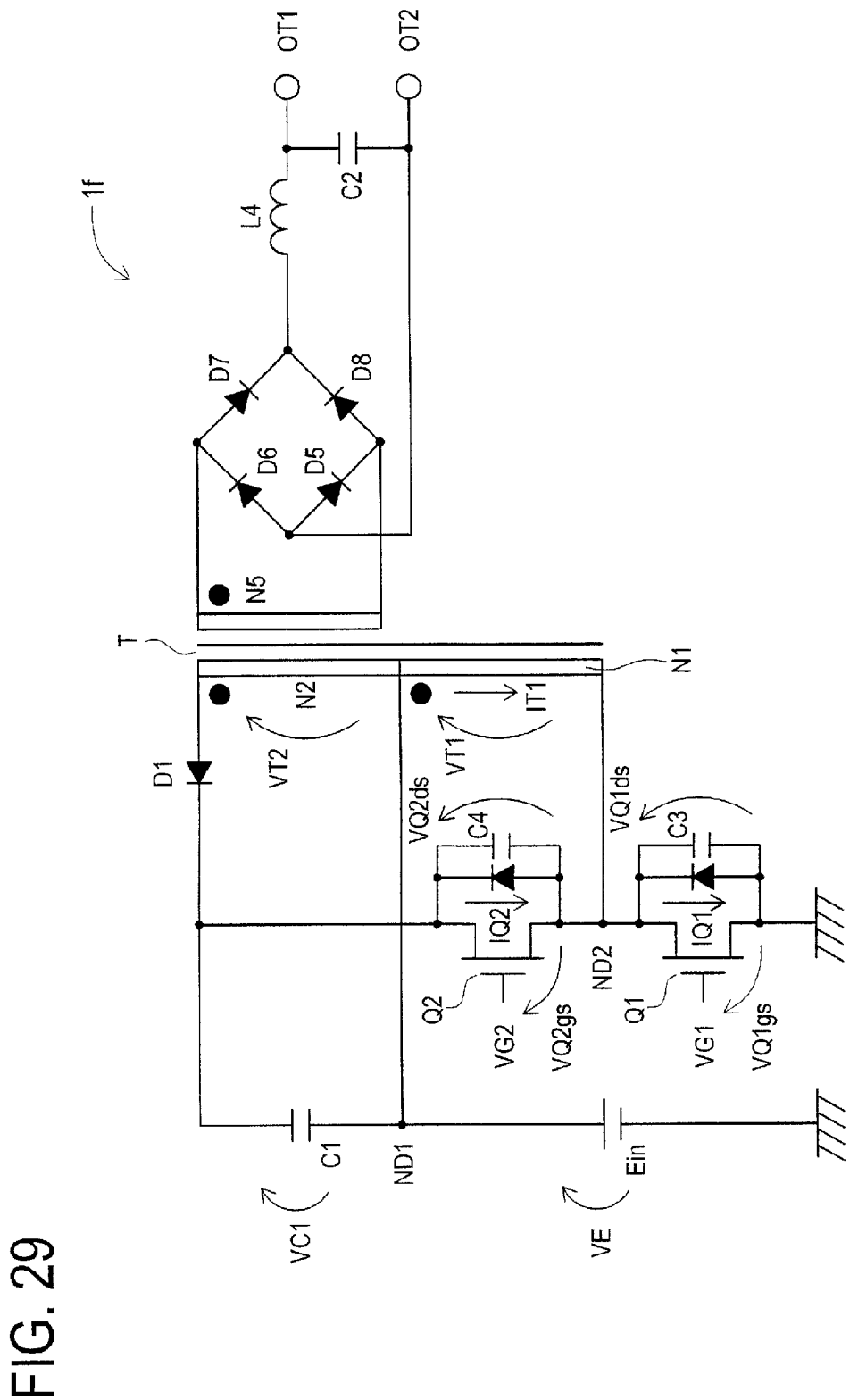
FIG. 29 is a circuit diagram showing a DC-DC converter 1f.

FIG. 29 is a circuit diagram of a DC-DC converter if according to the sixth embodiment. In the circuits of the DC-DC converter if, the circuit connected to the coils N1 and N2 of the transformer T is the same as that of the DC-DC converter 1b according to the second embodiment as shown in FIG. 8 and the circuit connected to the coils N5 of the transformer is the same as that of the DC-DC converter 1c according to the third embodiment as shown in FIG. 22. In the DC-DC converter if, it is possible to improve conversion efficiency similarly to the converter 1b. Also, similarly to the converter id, output voltages can be controlled by adjusting the duties of the transistors Q1 and Q2.

Figure 30:
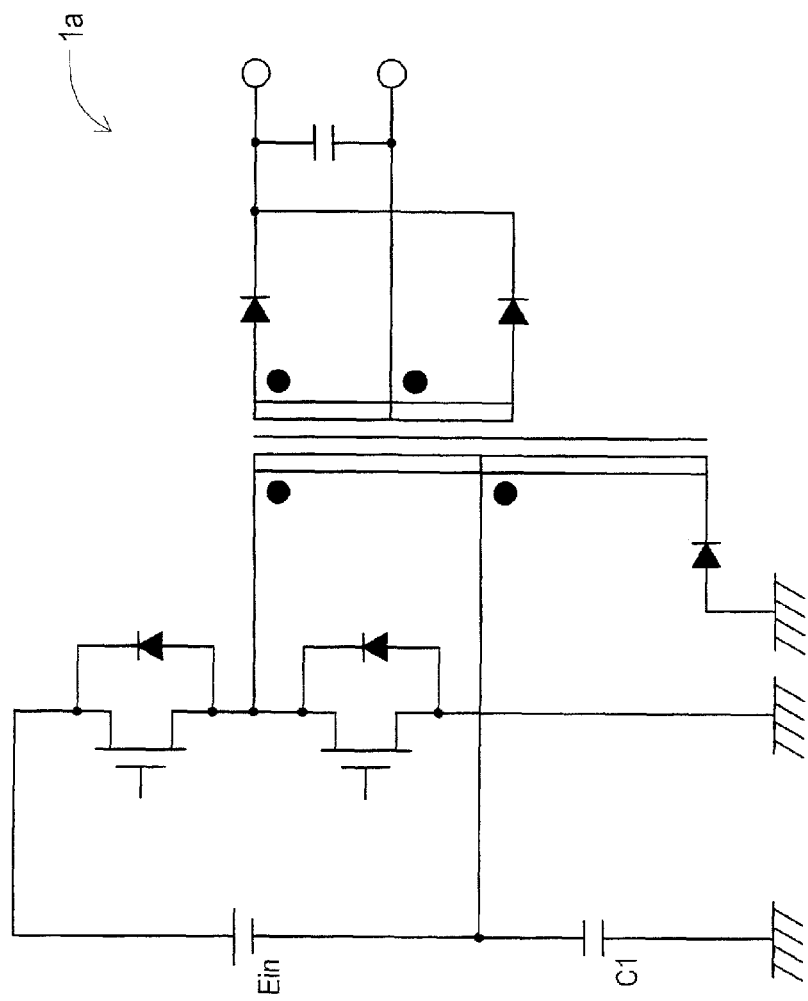
Figure 31:
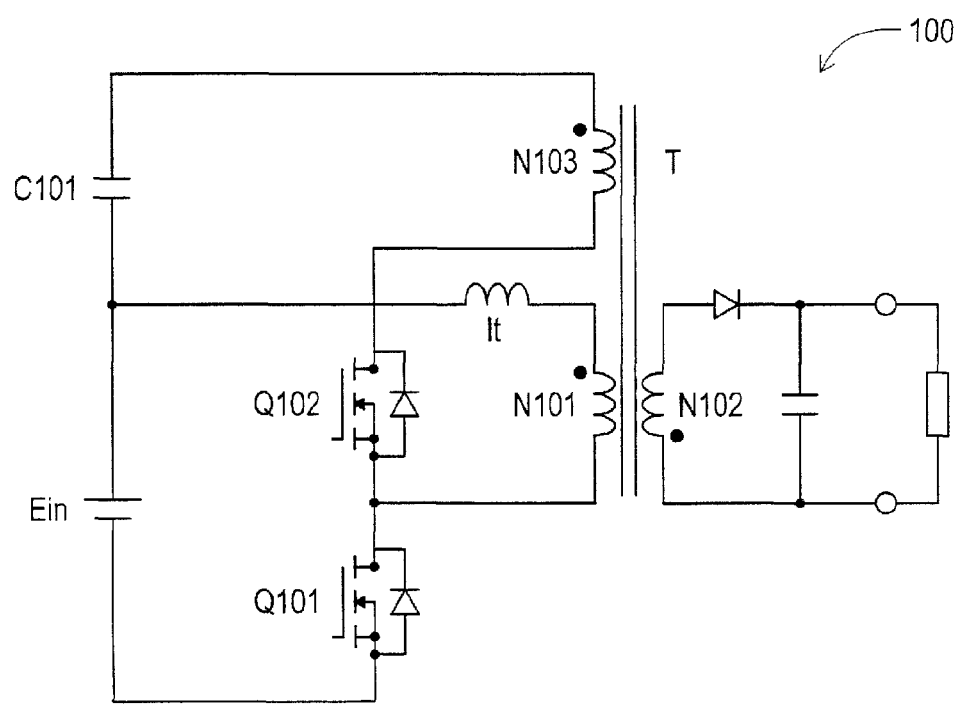
FIG. 31 is a circuit diagram showing a DC-DC converter 100 of a flyback type disclosed in PatenBDocument 1.

It is needless to say that the present invention is not limited to the embodiments, and is possible various improvements and modifications by the range in which it does not deviate from the spirit of the present invention. The DC-DC converter according to the present invention is not limited to the configuration of the DC-DC converter 1 shown in FIG. 1. It can be configured that the condenser C1 and the direct-current power supply Ein are connected with the ground oppositely like a DC-DC converter 1a shown in FIG. 30. In this case, it is needless to say to achieve the above-mentioned effect. Such configuration is applicable to the second embodiment to sixth embodiment.

Also, the transistors Q1 and Q2 are provided with the antiparallel diode. Here, the antiparallel diode may be the body diode of the transistors Q1 and Q2 or may be configured by another diode element.

What is claimed:

1. A DC-DC converter of a forward type comprising:
   a direct-current power supply;
   a first condenser;
   a first semiconductor switch element provided with an antiparallel diode;
   a second semiconductor switch element provided with an antiparallel diode;
   a first diode;
   a transformer provided with a first coil, a second coil and a third coil;
   a rectification circuit; and
   a smoothing circuit,
   wherein the direct-current power supply and the first condenser are connected in series,
   wherein the first semiconductor switch element and the second semiconductor switch element are connected in such a manner that the antiparallel diode of the first semiconductor switch element and the antiparallel diode of the second semiconductor switch element face a same direction, wherein a terminal of the first condenser that is not connected to the direct-current power supply and a terminal of the second semiconductor switch element that is not connected to the first semiconductor switch element are connected with each other, wherein a terminal of the direct-current power supply that is not connected to the first condenser and a terminal of the first semiconductor switch element that is not connected to the second semiconductor switch element are connected with each other, wherein the first coil of the transformer is connected between a connection point of the direct-current power supply and the first condenser and a connection point of the first semiconductor switch element and the second semiconductor switch element, wherein among a pair of terminals of the second coil of the transformer, one terminal of a same polarity as a terminal of the first coil that is connected to the direct-current power supply is connected to a connection point of the first condenser and the second semiconductor switch element through the first diode, and other terminal is connected to the connection point of the direct-power supply and the first condenser, wherein the third coil of the transformer is connected to the smoothing circuit through the rectification circuit, wherein a direction of the first diode is set in such a manner that energy can be transferred to the first condenser from the second coil of the transformer when the first semiconductor switch element is in a conduction state, and wherein the rectification circuit applied a voltage of same polarity to the smoothing circuit in both case where the first semiconductor switch element is in a conduction state and the second semiconductor switch element is in a conduction state.

2. The DC-DC converter according to claim 1, wherein the smoothing circuit is comprised of a smoothing coil, a smoothing condenser and a commutation diode.

3. The DC-DC converter according to claim 1,
wherein the rectification circuit is comprised of a second diode and a third diode,
wherein the third coil of the transformer is provided with a middle terminal,
wherein a first polarity terminal of the second diode is connected to one end of the third coil,
wherein a first polarity terminal of the third diode is connected to other end of the third coil,
wherein respective second polarity terminals of the second diode and the third diode are both connected to one end of a pair of input terminals of the smoothing circuit, and
wherein the middle terminal is connected to other end of the pair of input terminals of the smoothing circuit.

4. The DC-DC converter according to claim 1, wherein the rectification circuit is a diode bridge comprised of four diodes.

5. The DC-DC converter according to claim 1,
wherein the first semiconductor switch element is turned on during a period when the antiparallel diode of the second semiconductor switch element is in a conduction state.

6. The DC-DC converter according to claim 1, comprising,
a second condenser that is connected to the first semiconductor switch element in parallel; and
a third condenser that is connected to the second semiconductor switch element in parallel.

7. The DC-DC converter according to claim 6, wherein a capacity of the first condenser is increased in proportion to a capacity of the third condenser.

8. The DC-DC converter according to claim 6,
wherein the first semiconductor switch element is turned on during a period when the second condenser is in a non-charge state, and
wherein the second semiconductor switch element is turned on during a period when the third condenser is in a non-charge state.

* * * * *